United States Patent
Fujishima et al.

(10) Patent No.: US 12,162,737 B2
(45) Date of Patent: Dec. 10, 2024

(54) CONTROL METHOD FOR MOBILE OBJECT, MOBILE OBJECT, AND COMPUTER-READABLE STORAGE MEDIUM

(71) Applicant: Mitsubishi Logisnext Co., Ltd., Nagaokakyo (JP)

(72) Inventors: Yasuo Fujishima, Tokyo (JP); Ryoji Araki, Tokyo (JP); Kazushige Takaki, Tokyo (JP); Kenji Takao, Tokyo (JP); Yohei Chishiki, Tokyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 302 days.

(21) Appl. No.: 17/698,590

(22) Filed: Mar. 18, 2022

(65) Prior Publication Data
US 2022/0332554 A1 Oct. 20, 2022

(30) Foreign Application Priority Data
Apr. 7, 2021 (JP) ................................. 2021-065478

(51) Int. Cl.
*G01S 17/875* (2020.01)
*B66F 9/06* (2006.01)
(Continued)

(52) U.S. Cl.
CPC ............ *B66F 9/0755* (2013.01); *B66F 9/063* (2013.01); *G01S 17/08* (2013.01); *G01S 17/42* (2013.01);
(Continued)

(58) Field of Classification Search
CPC ........ B66F 9/0755; B66F 9/063; G01S 17/08; G01S 17/42; G01S 17/875
See application file for complete search history.

(56) References Cited

U.S. PATENT DOCUMENTS

| 4,684,247 A * | 8/1987 | Hammill, III ........... G01S 17/87 |
| | | 356/152.2 |
| 2017/0285643 A1 * | 10/2017 | Ichinose ................ G05D 1/021 |

(Continued)

FOREIGN PATENT DOCUMENTS

| BE | 1 013 354 A3 | 12/2001 |
| JP | 6492024 B2 | 3/2019 |

OTHER PUBLICATIONS

European Search Report dated Aug. 26, 2022 issued in corresponding European Patent Application No. 22 162 842.3.

*Primary Examiner* — Dale Moyer
(74) *Attorney, Agent, or Firm* — Birch, Stewart, Kolasch & Birch, LLP

(57) ABSTRACT

A control method for a mobile object automatically moving includes: causing the mobile object to move along a first path; causing a sensor of the mobile object to detect a position and an attitude of a target object while the mobile object is moving along the first path; setting a second path up to a target position at which predetermined position and attitude with respect to the target object are achieved based on the position and the attitude of the target object; switching the first path to the second path to move the mobile object along the second path; executing optimization calculation based on an evaluation function, to set a third path; and switching the second path to the third path to move the mobile object along the third path.

12 Claims, 15 Drawing Sheets

(51) Int. Cl.
*B66F 9/075* (2006.01)
*G01S 17/08* (2006.01)
*G01S 17/42* (2006.01)
*G05D 1/00* (2006.01)

(52) U.S. Cl.
CPC .......... *G01S 17/875* (2013.01); *G05D 1/0217* (2013.01)

(56) References Cited

U.S. PATENT DOCUMENTS

| | | |
|---|---|---|
| 2019/0155296 A1 | 5/2019 | Moore |
| 2019/0338809 A1 | 11/2019 | Clark et al. |
| 2022/0214692 A1* | 7/2022 | Chakravarty ........ G05D 1/0219 |

* cited by examiner

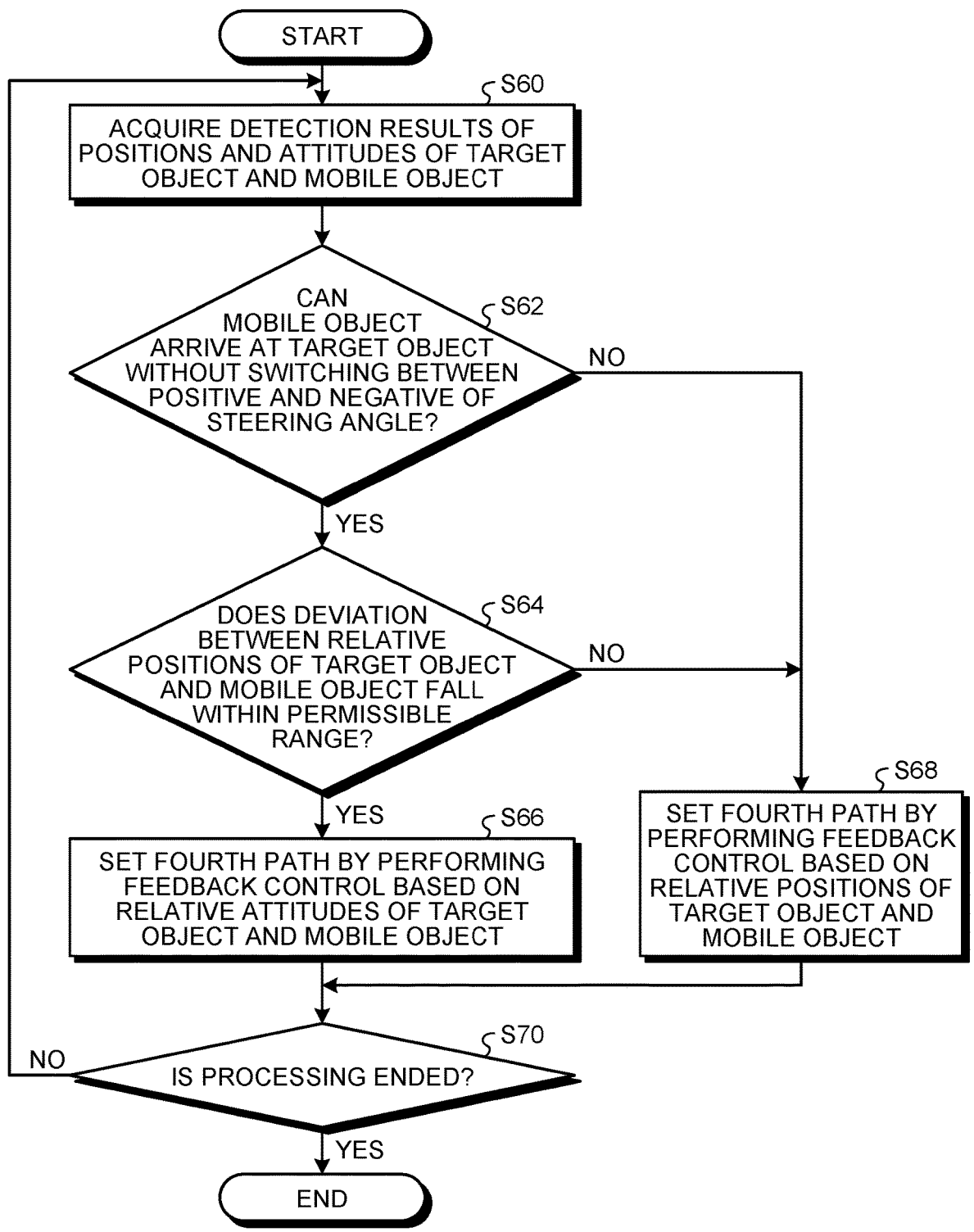

CONTROL METHOD FOR MOBILE OBJECT, MOBILE OBJECT, AND COMPUTER-READABLE STORAGE MEDIUM

CROSS-REFERENCE TO RELATED APPLICATIONS

The present application claims priority to and incorporates by reference the entire contents of Japanese Patent Application No. 2021-065478 filed in Japan on Apr. 7, 2021.

FIELD

The present disclosure relates to a control method for a mobile object, a mobile object, and a computer-readable storage medium.

BACKGROUND

For example, there is known a technique of causing a mobile object such as a forklift to automatically move to a target position. Patent Literature 1 discloses that an approach track to a target object is determined based on position information on the target object that is detected by a region measuring sensor mounted on a mobile object.

CITATION LIST

Patent Literature

Patent Literature 1: Japanese Patent No. 6492024

SUMMARY

Technical Problem

However, the method disclosed in Patent Literature 1 is assumed to be a control method that is used when the forklift comes close to a palette in some degree, the control method of causing the forklift to move while successively correcting approach track data prepared in advance. However, content of the approach track data is unknown. It is also obviously unknown how to correct the unknown approach track data. Additionally, in a case in which a position of the target object such as a palette is deviated from an expected position, for example, there is the possibility that the forklift cannot appropriately approach the target position by using the method disclosed in Patent Literature 1. Thus, there is a demand for making an appropriate approach to the target position.

The present disclosure is intended to solve the problem described above, and an object of the present disclosure is to provide a control method for a mobile object, a mobile object, and a computer-readable storage medium that can make an appropriate approach to the target position.

Solution to Problem

To solve the above problem and achieve the object, a control method according to the present disclosure is for a mobile object that automatically moves. The control method includes: causing the mobile object to move along a first path; causing a sensor mounted on the mobile object to detect a position and an attitude of a target object while the mobile object is moving along the first path; setting a second path up to a target position at which predetermined position and attitude with respect to the target object are achieved based on the position and the attitude of the target object; switching the first path to the second path to cause the mobile object to move along the second path; executing optimization calculation based on an evaluation function with which an evaluation becomes higher as a deviation between the position of the target object and the position of the mobile object becomes smaller, to set a third path; and switching the second path to the third path to cause the mobile object to move along the third path.

To solve the above problem and achieve the object, a mobile object according to the present disclosure automatically moves, and includes: a movement control unit configured to cause the mobile object to move along a first path; and a detection control unit configured to cause a sensor mounted on the mobile object to detect a position and an attitude of a target object while the mobile object is moving along the first path. The movement control unit switches the first path to a second path up to a target position at which predetermined position and attitude with respect to the target object are achieved, set based on the position and the attitude of the target object, and causes the mobile object to move along the second path, and switches the second path to a third path set by optimization calculation that is executed based on an evaluation function with which an evaluation becomes higher as a deviation between the position of the target object and the position of the mobile object becomes smaller, and causes the mobile object to move along the third path.

To solve the above problem and achieve the object, a non-transitory computer-readable storage medium according to the present disclosure stores a program for causing a computer to perform a control method for a mobile object that automatically moves. The program includes: causing the mobile object to move along a first path; causing a sensor mounted on the mobile object to detect a position and an attitude of a target object while the mobile object is moving along the first path; setting a second path up to a target position at which predetermined position and attitude with respect to the target object are achieved based on the position and the attitude of the target object; switching the first path to the second path to cause the mobile object to move along the second path; executing optimization calculation based on an evaluation function with which an evaluation becomes higher as a deviation between the position of the target object and the position of the mobile object becomes smaller, to set a third path; and switching the second path to the third path to cause the mobile object to move along the third path.

Advantageous Effects of Invention

According to the present disclosure, an appropriate approach to the target position can be made.

BRIEF DESCRIPTION OF DRAWINGS

FIG. 16 is a flowchart for explaining setting of the fourth path.

DESCRIPTION OF EMBODIMENTS

The following describes preferred embodiments of the present invention in detail with reference to the attached drawings. The present invention is not limited to the embodiments. In a case in which there are a plurality of embodiments, the present invention encompasses a combination of the embodiments.

First Embodiment

Entire Configuration of Movement Control System

Figure 1:
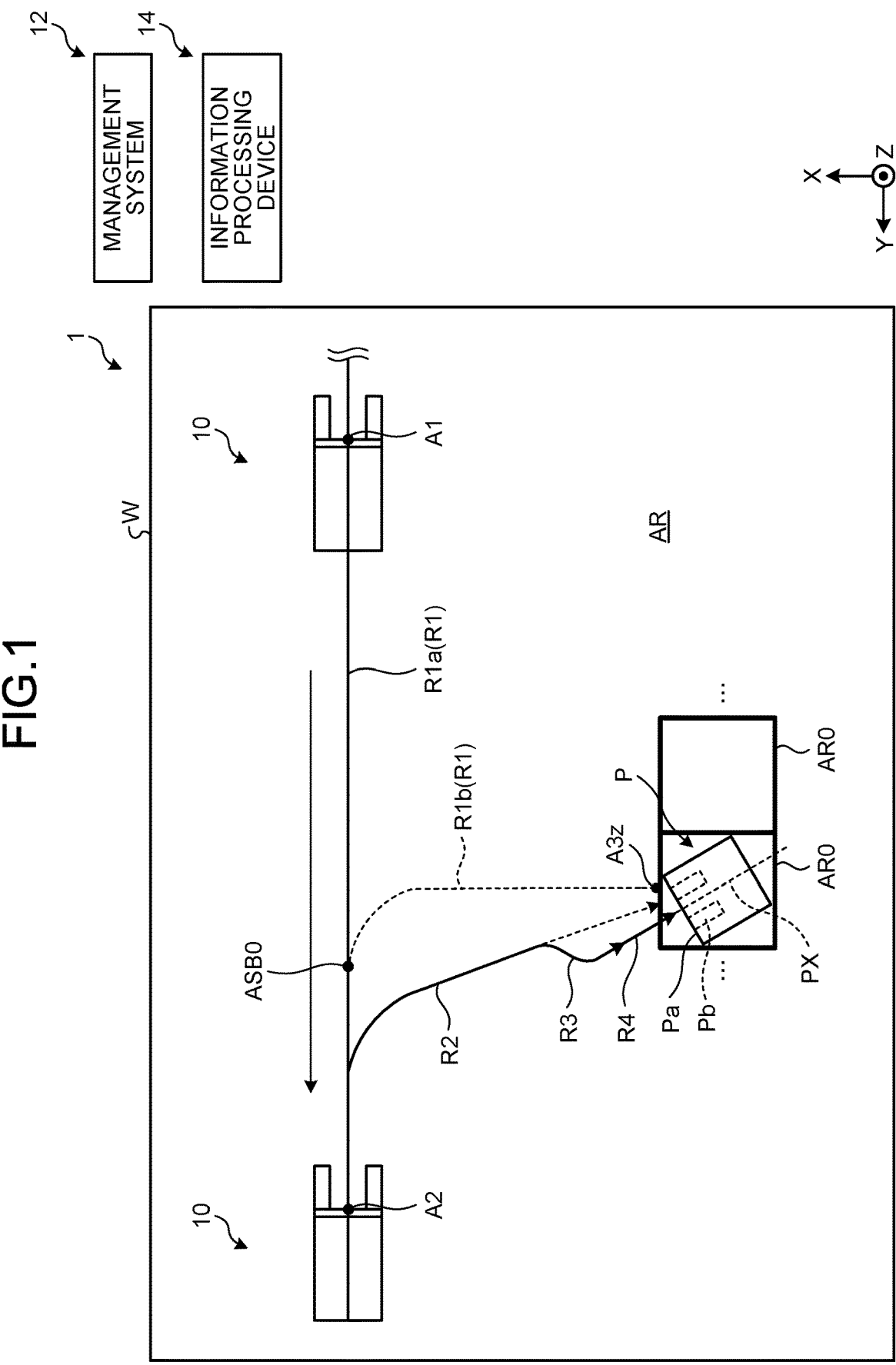
FIG. 1 is a schematic diagram of a movement control system according to a first embodiment.

FIG. 1 is a schematic diagram of a movement control system according to a first embodiment. As illustrated in FIG. 1, a movement control system 1 according to the first embodiment includes a mobile object 10, a management system 12, and an information processing device 14. The movement control system 1 is a system that controls movement of the mobile object 10 belonging to a facility W. The facility W is, for example, a facility such as a warehouse in which physical distribution is managed. In the movement control system 1, the mobile object 10 is caused to pick up and convey a target object P disposed in a region AR of the facility W. The region AR is, for example, a floor face of the facility W, which is a region in which the target object P is disposed and the mobile object 10 moves. In the present embodiment, the target object P is an object to be conveyed in which a load is mounted on a palette. An opening Pb is formed on a front surface Pa of the target object P, the opening Pb into which a fork 24 (described later) of the mobile object 10 is inserted. However, the target object P may have an optional form instead of the palette on which the load is mounted. For example, the target object P may be the load alone without the palette. Hereinafter, a direction along the region AR is assumed to be a direction X, and a direction along the region A and intersecting with the direction X is assumed to be a direction Y. In the present embodiment, the direction Y is a direction orthogonal to the direction X. The direction X and the direction Y may also be referred to as horizontal directions. A direction orthogonal to the direction X and the direction Y, that is, a vertical direction is assumed to be a direction Z.

A plurality of disposition regions AR0 are arranged in the region AR within the facility W. Each of the disposition regions AR0 is a region in which the target object P is disposed. The disposition region AR0 is set in advance as a region in which the target object P should be disposed. The disposition region AR0 is partitioned by a white line and the like, for example, and a position (coordinates), a shape, and a size of the disposition region AR0 are set in advance. In the disposition region AR0, the target object P is disposed such that the front surface Pa faces the direction X side. The target object P is preferably disposed in the disposition region AR such that an axis PX, which is orthogonal to the front surface Pa when viewed from the direction Z, runs along the direction X, that is, orientation of the target object P is aligned with the disposition region AR0. However, as illustrated in FIG. 1, the target object P may be disposed such that the axis PX does not run along the direction X and is inclined from the direction X, that is, the orientation of the target object P is misaligned with the disposition region AR. For example, it is preferable that the target object P is disposed in the disposition region AR0 such that an inclination angle between the axis PX and the direction X is equal to or smaller than 45 degrees.

In the present embodiment, the disposition region AR0 is arranged in the region AR that is a floor of the facility W, but the embodiment is not limited thereto. For example, the disposition region AR0 may be arranged in a load-carrying platform of a vehicle that has carried the target object P into the facility W. In the present embodiment, the disposition region AR0 is partitioned for each target object P, and one target object P is disposed in the disposition region AR0. However, the embodiment is not limited thereto. For example, the disposition region AR0 may be set as a free space in which a plurality of the target objects P are disposed. In the example of FIG. 1, the disposition region AR0 has a rectangular shape, but the shape and the size thereof may be optional. The number of the disposition regions AR0 arranged in the region AR may also be optional.

The mobile object 10 is a device that can automatically move. In the present embodiment, the mobile object 10 is a forklift, more specifically, what is called an Automated Guided Forklift (AGF). As exemplified in FIG. 1, the mobile object 10 moves in the region AR in the facility W. While moving from a first position A1 to a second position A2 along a first path R1 (original path), the mobile object 10 detects a position and attitude of the target object P with sensors 26 (described later). Herein, the position of the target object P means coordinates on a two-dimensional surface along the direction X and the direction Y, and the attitude of the target object P means a tilt angle of the axis PX viewed from a direction orthogonal to the direction X and the direction Y assuming that the X-direction is 0°. When arriving at the second position A2, the mobile object 10 moves from the second position A2 to the target object P along a second path R2 (global path) that is set based on the position and the attitude of the target object P, and switches, in the middle of movement, the second path R2 to a third path R3 (local path) that is set by optimization calculation to further approach the vicinity of the target object P along the third path R3. The mobile object 10 then switches the third path R3 to a fourth path R4 that is set by feedback control, arrives at the target object P along the fourth path R4, and picks up the target object P. A coordinate system on the two-dimensional surface along the direction X and the direction Y may be a local coordinate system based on the region AR using a reference point in the region AR as an origin, or a global coordinate system using a reference point on the earth as an origin. The first path R1, the second path R2, the third path R3, and the fourth path R4 illustrated in FIG. 1 are merely examples, and details about the first path R1, the second path R2, the third path R3, and the fourth path R4 will be described later.

Mobile Object

Figure 2:
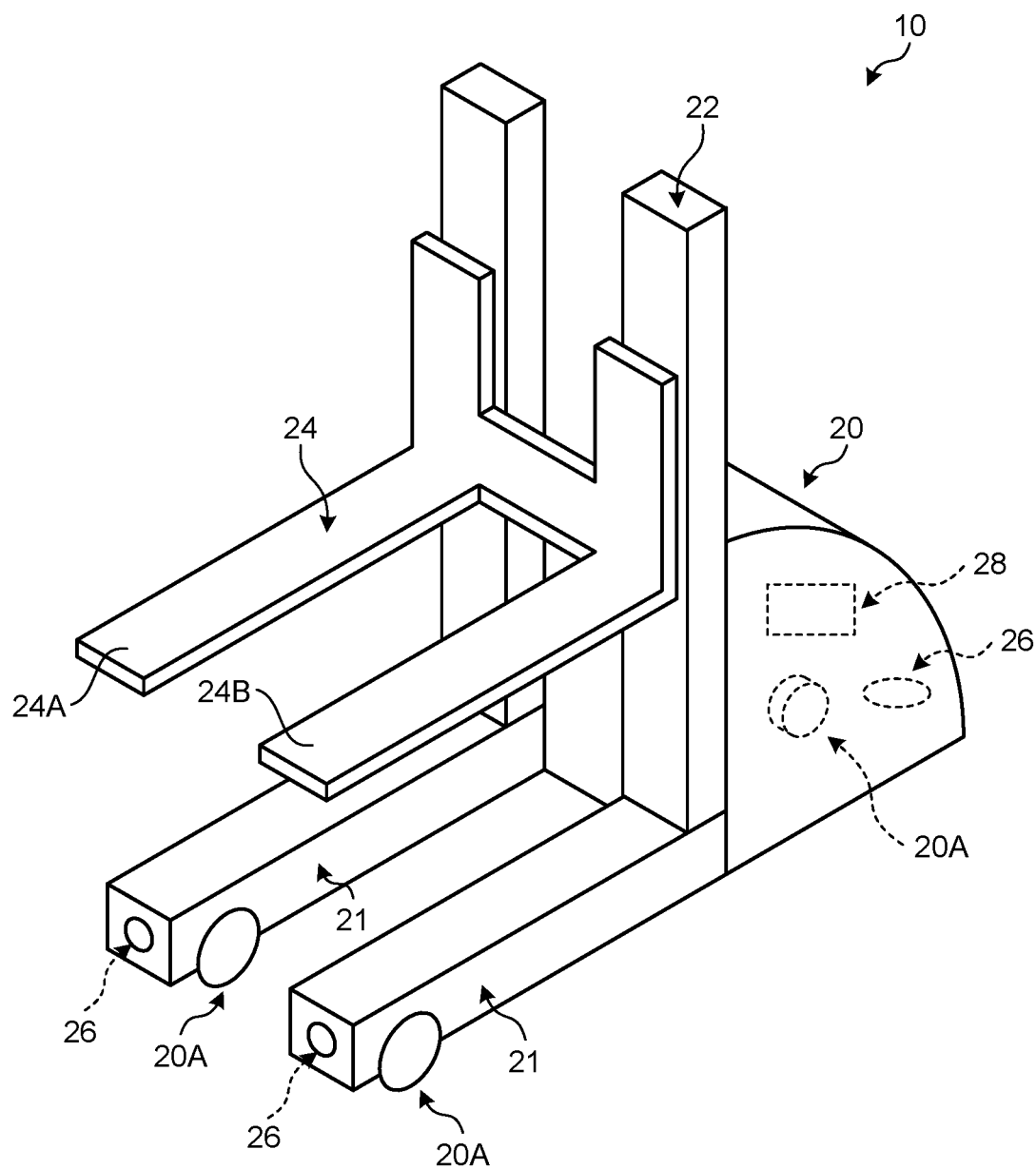
FIG. 2 is a schematic diagram of a configuration of a mobile object.

FIG. 2 is a schematic diagram of a configuration of the mobile object. As illustrated in FIG. 2, the mobile object 10 includes a vehicle body 20, wheels 20A, straddle legs 21, a mast 22, the fork 24, the sensors 26, and a control device 28. The straddle legs 21 are a pair of axial members projecting from the vehicle body 20 disposed on one end part in a front and rear direction of the vehicle body 20. The wheels 20A are disposed on distal ends of the respective straddle legs 21 and the vehicle body 20. That is, the three wheels 20A are disposed in total, but positions and the number of the wheels 20A may be optional. The mast 22 is attached to the straddle leg 21 in a movable manner, and moves in the front and rear direction of the vehicle body 20. The mast 22 extends along an upper and lower direction (the direction Z herein) orthogonal to the front and rear direction. The fork 24 is attached to the mast 22 in a manner movable in the direction Z. The fork 24 may also be movable in a lateral direction (a direction intersecting with the upper and lower direction and the front and rear direction) of the vehicle body 20 with respect to the mast 22. The fork 24 includes a pair of hooks 24A and 24B. The hooks 24A and 24B extend toward a front direction of the vehicle body 20 from the mast 22. The hook 24A and the hook 24B are disposed to be separated from each other in a lateral direction of the mast 22. Hereinafter, regarding the front and rear direction, a direction toward a side on which the fork 24 is arranged in the mobile object 10 is assumed to be a front direction, and a direction toward a side on which the fork 24 is not arranged is assumed to be a rear direction.

Each of the sensors 26 detects at least one of a position and an attitude of an object that is present around the vehicle body 20. It can also be said that the sensor 26 detects the position of the object with respect to the mobile object 10, and the attitude of the object with respect to the mobile object 10. In the present embodiment, the sensors 26 are disposed on distal ends of the respective straddle legs 21 and on a backward side of the vehicle body 20. However, the positions at which the sensors 26 are disposed are not limited thereto. The sensors 26 may be disposed at optional positions, and the number of the sensors 26 to be disposed may also be optional. For example, a safety sensor installed on the mobile object 10 may also be used as the sensor 26. By using the safety sensor as the sensor 26, another sensor is not required to be installed.

The sensor 26 is, for example, a sensor that emits laser light. The sensor 26 emits laser light while performing scanning in one direction (herein, a lateral direction), and detects the position and the orientation of the object from reflected light of the emitted laser light. That is, the sensor 26 can be assumed to be what is called a 2D-Light Detection And Ranging (LiDAR). However, the sensor 26 is not limited thereto, and may be a sensor that detects the object using an optional method. For example, the sensor 26 may be what is called a 3D-LiDAR that scans in a plurality of directions, or may be a camera.

The control device 28 controls movement of the mobile object 10. The control device 28 will be described later.

Management System

Figure 3:
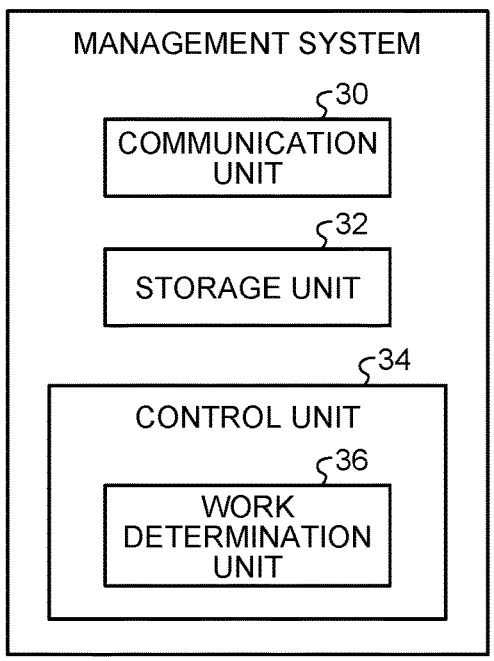
FIG. 3 is a schematic block diagram of a management system.

FIG. 3 is a schematic block diagram of the management system. The management system 12 is a system that manages physical distribution in the facility W. The management system 12 is a Warehouse Management System (WMS) in the present embodiment, but may be an optional system, not limited to the WMS. For example, the management system 12 may be a back-end system such as another production management system. A position at which the management system 12 is disposed is optional. The management system 12 may be disposed in the facility W, or may be disposed at a position remote from the facility W to manage the facility W from the remote position. The management system 12 is a computer, and includes a communication unit 30, a storage unit 32, and a control unit 34 as illustrated in FIG. 3.

The communication unit 30 is a module that is used by the control unit 34 to communicate with an external device such as the information processing device 14, and may include an antenna and the like, for example. A communication scheme used by the communication unit 30 is wireless communication in the present embodiment, but the communication scheme may be optional. The storage unit 32 is a memory that stores various kinds of information such as a computer program or arithmetic content of the control unit 34, and includes at least one of a random access memory (RAM), a main storage device such as a read only memory (ROM), and an external storage device such as a hard disk drive (HDD), for example.

The control unit 34 is an arithmetic device, and includes an arithmetic circuit such as a central processing unit (CPU), for example. The control unit 34 includes a work determination unit 36. The control unit 34 implements the work determination unit 36 by reading out, from the storage unit 32, and executing a computer program (software), and performs processing thereof. The control unit 34 may perform processing by one CPU, or may include a plurality of CPUs and perform processing by the CPUs. The work determination unit 36 may also be implemented by a hardware circuit. A computer program for the control unit 34 stored in the storage unit 32 may be stored in a storage medium that can be read by the management system 12 including a computer.

The work determination unit 36 determines the target object P to be conveyed. Specifically, the work determination unit 36 determines work content indicating information on the target object P to be conveyed based on an input work plan, for example. It can also be said that the work content is information for specifying the target object P to be conveyed. In the example of the present embodiment, the work content determines which target object P in which facility is conveyed to where by when. That is, the work determination unit 36 is information indicating the facility in which the target object P to be conveyed is stored, the target object P to be conveyed, a conveyance destination of the target object P, and a conveyance timing of the target object P. The work determination unit 36 transmits the determined work content to the information processing device 14 via the communication unit 30.

Information Processing Device

Figure 4:
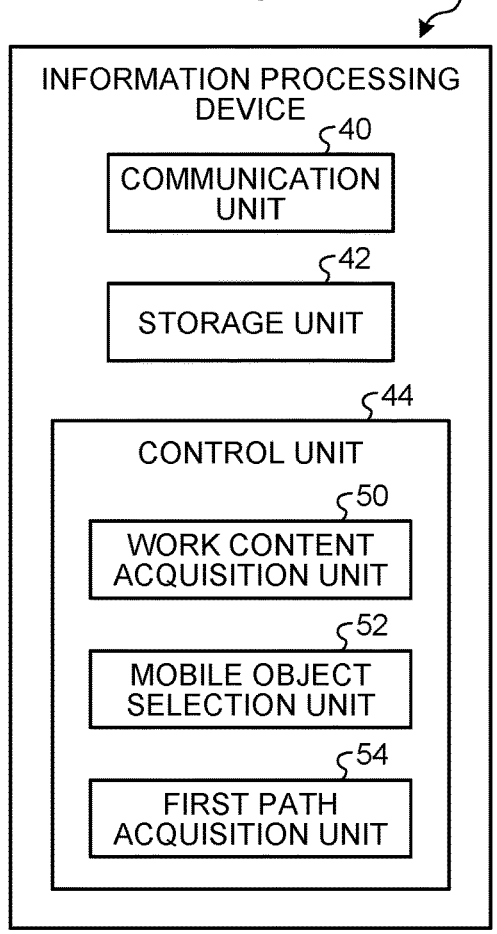
FIG. 4 is a schematic block diagram of an information processing device.

FIG. 4 is a schematic block diagram of the information processing device. The information processing device 14 is a device that is disposed in the facility W and at least performs an arithmetic operation of information related to movement of the mobile object 10 and the like, that is, what is called a ground system. The information processing device 14 is a computer, and includes a communication unit 40, a storage unit 42, and a control unit 44 as illustrated in FIG. 4. The communication unit 40 is a module that is used by the control unit 44 to communicate with an external device such as the management system 12 and the mobile object 10, and may include an antenna, for example. A communication scheme used by the communication unit 40 is wireless communication in the present embodiment, but the communication scheme may be optional. The storage unit 42 is a memory that stores various kinds of information such as a computer program or arithmetic content of the control unit 44, and includes at least one of a RAM, a main storage device such as a ROM, and an external storage device such as an HDD, for example. In the present embodiment, the management system 12 and the information processing device 14 are different devices, but they may be integrated with each other. That is, the management system 12 may also have at least part of the function of the information processing device 14, or the information processing device 14 may also have at least part of the function of the management system 12.

The control unit 44 is an arithmetic device, and includes an arithmetic circuit such as a CPU, for example. The control unit 44 includes a work content acquisition unit 50, a mobile object selection unit 52, and a first path acquisition unit 54. The control unit 44 implements the work content acquisition unit 50, the mobile object selection unit 52, and the first path acquisition unit 54 by reading out, from the storage unit 42, and executing a computer program (software), and performs processing thereof. The control unit 44 may perform the processing by one CPU, or may include a plurality of CPUs and perform the processing by the CPUs. At least part of the work content acquisition unit 50, the mobile object selection unit 52, and the first path acquisition unit 54 may be implemented by a hardware circuit. A computer program for the control unit 44 stored in the storage unit 42 may be stored in a storage medium that can be read by the information processing device 14 including a computer.

Work Content Acquisition Unit and Mobile Object Selection Unit

The work content acquisition unit 50 acquires information on the work content determined by the management system 12, that is, information on the target object P to be conveyed. The work content acquisition unit 50 specifies the disposition region AR0 in which the target object P is disposed based on the information on the target object P in the work content. For example, the storage unit 42 stores the target object P and the disposition region AR0 in which the target object P is disposed in association with each other, and the work content acquisition unit 50 specifies the disposition region AR0 by reading out the information from the storage unit 42. The mobile object selection unit 52 selects the mobile object 10 to be operated. For example, the mobile object selection unit 52 selects the mobile object 10 to be operated from among a plurality of the mobile objects belonging to the facility W. The mobile object selection unit 52 may select the mobile object 10 to be operated, using an optional method. For example, based on the disposition region AR0 specified by the work content acquisition unit 50, the mobile object selection unit 52 may select the mobile object 10 suitable for conveyance of the target object P in the disposition region AR0 as the mobile object 10 to be operated.

First Path Acquisition Unit

The first path acquisition unit 54 acquires information about the first path R1 to the disposition region AR0 specified by the work content acquisition unit 50. The first path R1 is set in advance for each of the disposition regions AR0, for example. The first path acquisition unit 54 acquires, from the storage unit 42, for example, the first path R1 that is set for the disposition region AR0 specified by the work content acquisition unit 50. The following specifically describes the first path R1. The first path R1 is set based on a coordinate system on the two-dimensional surface along the direction X and the direction Y, so that the first path R1 may be a track in the local coordinate system based on the region AR, or may be a track in the global coordinate system.

As illustrated in FIG. 1, the first path R1 is a track that traverses the disposition region AR0 (target object P) along the direction Y on the direction X side of the disposition region AR0 (target object P) toward which the mobile object 10 moves. More specifically, the first path R1 includes a detection track R1a and an approach track R1b connected to the detection track R1a.

As illustrated in FIG. 1, the detection track R1a is a track that traverses the disposition region AR0 (target object P) along the direction Y on the direction X side of the disposition region AR0 (target object P). The detection track R1a is preferably set such that a distance in the direction X to the disposition region AR0 falls within a range of a predetermined distance. Herein, the predetermined distance is a distance at which the sensor 26 of the mobile object 10 moving on the detection track R1a can detect the position and the attitude of the target object P in the disposition region AR0. More specifically, in the present embodiment, the detection track R1a is a track from the first position A1 to the second position A2. The first position A1 is set as a position on the direction X side of the disposition region AR0, and on a side opposite to the direction Y side of the disposition region AR0. The second position A2 is set as a position on the direction X side of the disposition region AR0, and on the direction Y side of the disposition region AR0. In the present embodiment, the first position A1 and the second position A2 are set such that the distance in the direction X to the disposition region AR0 falls within the range of the predetermined distance, and the positions in the direction X (X-coordinates) of the first position A1 and the second position A2 are identical to each other. The detection track R1a is set as a linear track along the direction Y from the first position A1 to the second position A2. However, the positions in the direction X (X-coordinates) of the first position A1 and the second position A2 are not necessarily identical to each other. The detection track R1a is not limited to the linear track, and may be a track depicting an optional locus from the first position A1 to the second position A2.

As illustrated in FIG. 1, the approach track R1b is a track from the second position A2 toward the disposition region AR0. More specifically, the approach track R1b is a track from the second position A2 to a set position A3z. The set position A3z is a position and an attitude that are predetermined position and attitude with respect to the target object P assuming that the position and the attitude of the target object P in the disposition region AR0 satisfy a predetermined state (the target object P is ideally disposed without misalignment with the disposition region AR0). That is, the set position A3z is a position and an attitude at and with which the mobile object 10 can pick up the target object P assuming that the position and the attitude of the target object P satisfy the predetermined state, and it can also be said that the set position A3z is the target position A3 in a case in which the position and the attitude of the target object P satisfy the predetermined state. In the example of FIG. 1, the approach track R1b includes a linear track from the second position A2 to an intermediate position ASB0 on a side opposite to the direction Y of the second position A2, and a curved track from the intermediate position ASB0 to the set position A3z. The linear track from the second position A2 to the intermediate position ASB0 preferably overlaps the detection track R1a.

Although not illustrated herein, the first path R1 may also include a track from a movement start position of the mobile object 10 to the first position A1.

However, the first path R1 is not limited to the track as described above. For example, the detection track R1*a* of the first path R1 is not necessarily a track parallel with the direction Y. For example, the first path R1 does not necessarily include the approach track R1*b*. That is, the first path R1 may include at least the detection track R1*a* from the first position A1 to the second position A2. Furthermore, the first path R1 does not necessarily include a track traversing the disposition region AR0 (target object P) such as the detection track R1*a*, but may be a track linearly approaching a front surface of the disposition region AR0 (target object P), for example. Additionally, the first path R1 is not limited to a track along which the mobile object 10 moves straight in a rear direction to traverse the disposition region AR0 (target object P), and turns back at the second position A2. The first path R1 may be a track along which the mobile object 10 moves straight in a front direction and turns to approach the front surface of the disposition region AR0 (target object P).

The first path R1 is set in advance based on map information on the facility W. The map information on the facility W is information including positional information on an obstacle (such as a pillar) disposed in the facility W, a passage along which the mobile object 10 can travel, and the like, that is, information indicating a region in which the mobile object 10 can move in the region AR. The first path R1 may be set also based on information about vehicle specifications of the mobile object 10 in addition to the map information on the facility W. The information about the vehicle specifications is, for example, specifications that influence a route along which the mobile object 10 can move, such as a size or a minimum turning radius of the mobile object 10. In a case in which the first path R1 is set also based on the information about the vehicle specifications, the first path R1 may be set for each mobile object. The first path R1 may also be set by a person based on the map information, the information about the vehicle specifications, and the like, or may be automatically set by a device such as the information processing device 14 based on the map information, the information about the vehicle specifications, and the like. In a case of automatically setting the first path R1, for example, a point desired to be passed through (Waypoint) may be designated, for example. In this case, the shortest first path R1 can be set to pass through the point desired to be passed through while avoiding an obstacle (a fixed object such as a wall).

The first path acquisition unit 54 may set the first path R1 without reading out the first path R1 set in advance. In this case, the first path acquisition unit 54 may generate, as the first path R1, a route from a current position of the mobile object 10 to the set position A3*z* as a movement destination via the first position A1 and the second position A2 based on positional information on the mobile object 10 to be operated, positional information on the disposition region AR0, and the map information on the facility W.

The information processing device 14 transmits the acquired information on the first path R1 to the mobile object 10 to be operated via the communication unit 40. The first path R1 is a route to the disposition region AR0, so that it can be said that the first path R1 is information related to movement of the mobile object 10.

Figure 5:
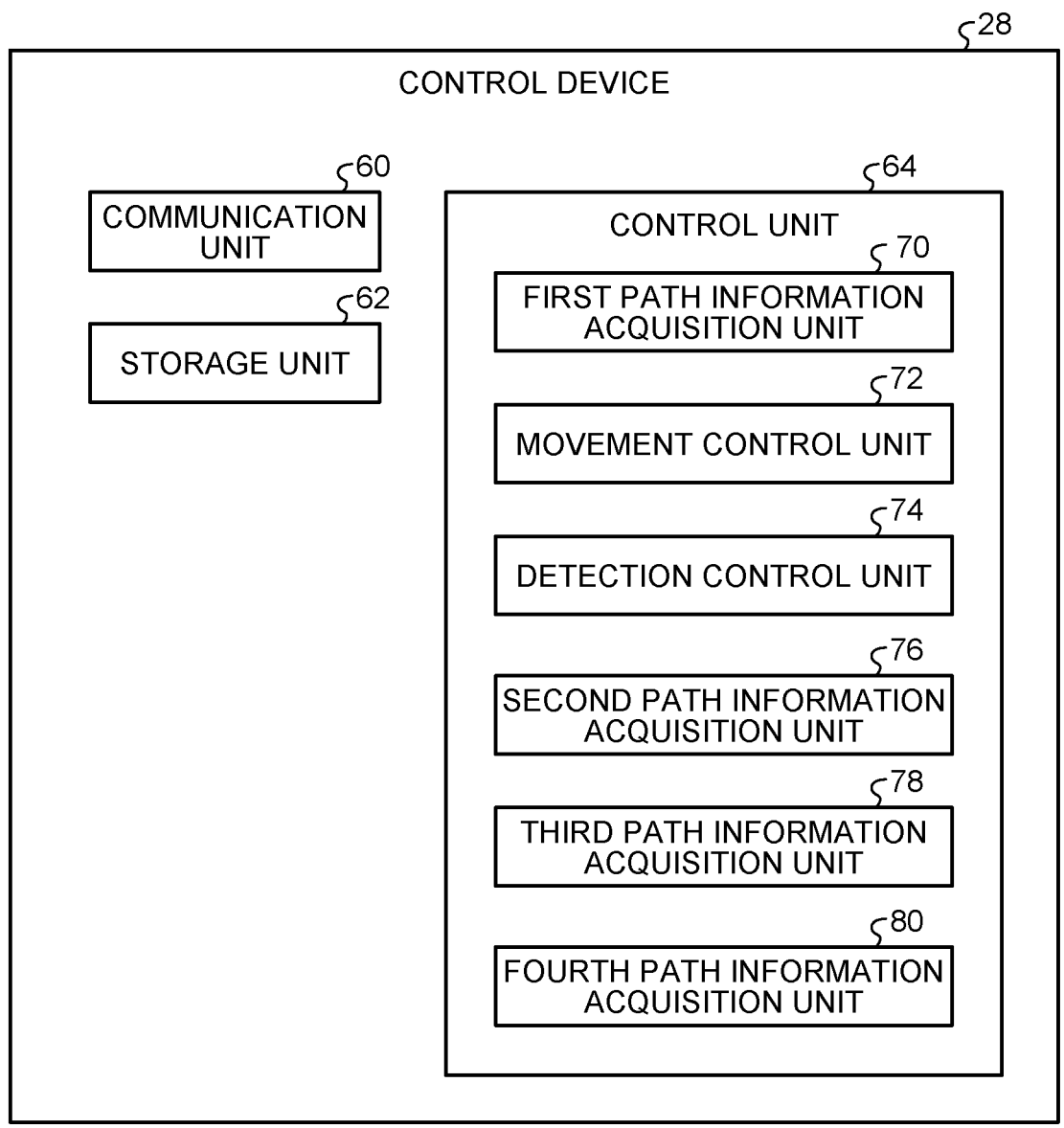
FIG. 5 is a schematic block diagram of a control device for the mobile object.

Control device for mobile object Next, the following describes the control device 28 for the mobile object 10. FIG. 5 is a schematic block diagram of the control device for the mobile object. The control device 28 controls the mobile object 10. The control device 28 is a computer, and includes a communication unit 60, a storage unit 62, and a control unit 64 as illustrated in FIG. 5. The communication unit 60 is a module that is used by the control unit 64 to communicate with an external device such as the information processing device 14, and may include an antenna and the like, for example. A communication scheme used by the communication unit 60 is wireless communication in the present embodiment, but the communication scheme may be optional. The storage unit 62 is a memory that stores various kinds of information such as a computer program or arithmetic content of the control unit 64, and includes at least one of a RAM, a main storage device such as a ROM, and an external storage device such as an HDD, for example.

The control unit 64 is an arithmetic device, and includes an arithmetic circuit such as a CPU, for example. The control unit 64 includes a first path information acquisition unit 70, a movement control unit 72, a detection control unit 74, a second path information acquisition unit 76, a third path information acquisition unit 78, and a fourth path information acquisition unit 80. The control unit 64 implements the first path information acquisition unit 70, the movement control unit 72, the detection control unit 74, the second path information acquisition unit 76, the third path information acquisition unit 78, and the fourth path information acquisition unit 80 by reading out, from the storage unit 62, and executing a computer program (software), and performs processing thereof. The control unit 64 may perform the processing by one CPU, or may include a plurality of CPUs and perform the processing by the CPUs. At least part of the first path information acquisition unit 70, the movement control unit 72, the detection control unit 74, the second path information acquisition unit 76, the third path information acquisition unit 78, and the fourth path information acquisition unit 80 may be implemented by a hardware circuit. A computer program for the control unit 64 stored in the storage unit 62 may be stored in a storage medium that can be read by the control device 28 including computer.

First Path Information Acquisition Unit

The first path information acquisition unit 70 acquires information about the first path R1. When the mobile object 10 is selected to be operated, the first path information acquisition unit 70 may acquire the information about the first path R1 from the information processing device 14, or may read out the information about the first path R1 previously stored in the storage unit 62.

Movement Control Unit

The movement control unit 72 controls movement of the mobile object 10 by controlling a moving mechanism such as a driving unit or a steering system of the mobile object 10. The movement control unit 72 causes the mobile object 10 to move along the first path R1 acquired by the first path information acquisition unit 70. The movement control unit 72 causes the mobile object 10 to move from the current position of the mobile object 10 to the second position A2 via the first position A1 along the first path R1. By successively grasping the positional information on the mobile object 10, the movement control unit 72 causes the mobile object 10 to move to pass through the first path R1. A method of acquiring the positional information on the mobile object 10 is optional. For example, in the present embodiment, a detection body (not illustrated) is disposed in the facility W, and the movement control unit 72 acquires information about the position and the attitude of the mobile object 10 based on detection of the detection body. Specifically, the mobile object 10 emits laser light toward the detection body, and receives reflected light of the laser light reflected from the detection body to detect the position and the attitude of the mobile object 10 in the facility W. Herein, the position of the mobile object 10 is two-dimensional coordinates in the direction X and the direction Y in the region AR of the facility W, and in the following description, the position means two-dimensional coordinates in the region AR unless otherwise indicated. The attitude of the mobile object 10 is a yaw angle (rotation angle) of the mobile object 10 assuming that the X-direction is 0°, when viewed from the direction Z orthogonal to the direction X and the direction Y. A method of acquiring the information about the position and the attitude of the mobile object 10 is not limited to using the detection body. For example, Simultaneous Localization and Mapping (SLAM) may be used.

Detection Control Unit

The detection control unit 74 causes the sensor 26 to detect the position and the attitude of the target object P, and acquires a detection result of the position and the attitude of the target object P obtained by the sensor 26.

Second Path Information Acquisition Unit

The second path information acquisition unit 76 acquires information about the second path R2 that is set based on the position and the attitude of the target object P. Specific processing performed by the second path information acquisition unit 76 will be described later.

Third Path Information Acquisition Unit

The third path information acquisition unit 78 acquires information about the third path R3 that is set by optimization calculation. Specific processing performed by the third path information acquisition unit 78 will be described later.

Fourth Path Information Acquisition Unit

The fourth path information acquisition unit 80 acquires information about the fourth path R4 that is set by performing feedback control based on at least one of relative positions and relative attitudes of the target object P and the mobile object 10. Specific processing performed by the fourth path information acquisition unit 80 will be described later.

Processing Performed by Control Device

Next, the following describes processing performed by the control device 28 at the time when the mobile object 10 moves toward the target object P.

Movement Along First Path

Figure 6:
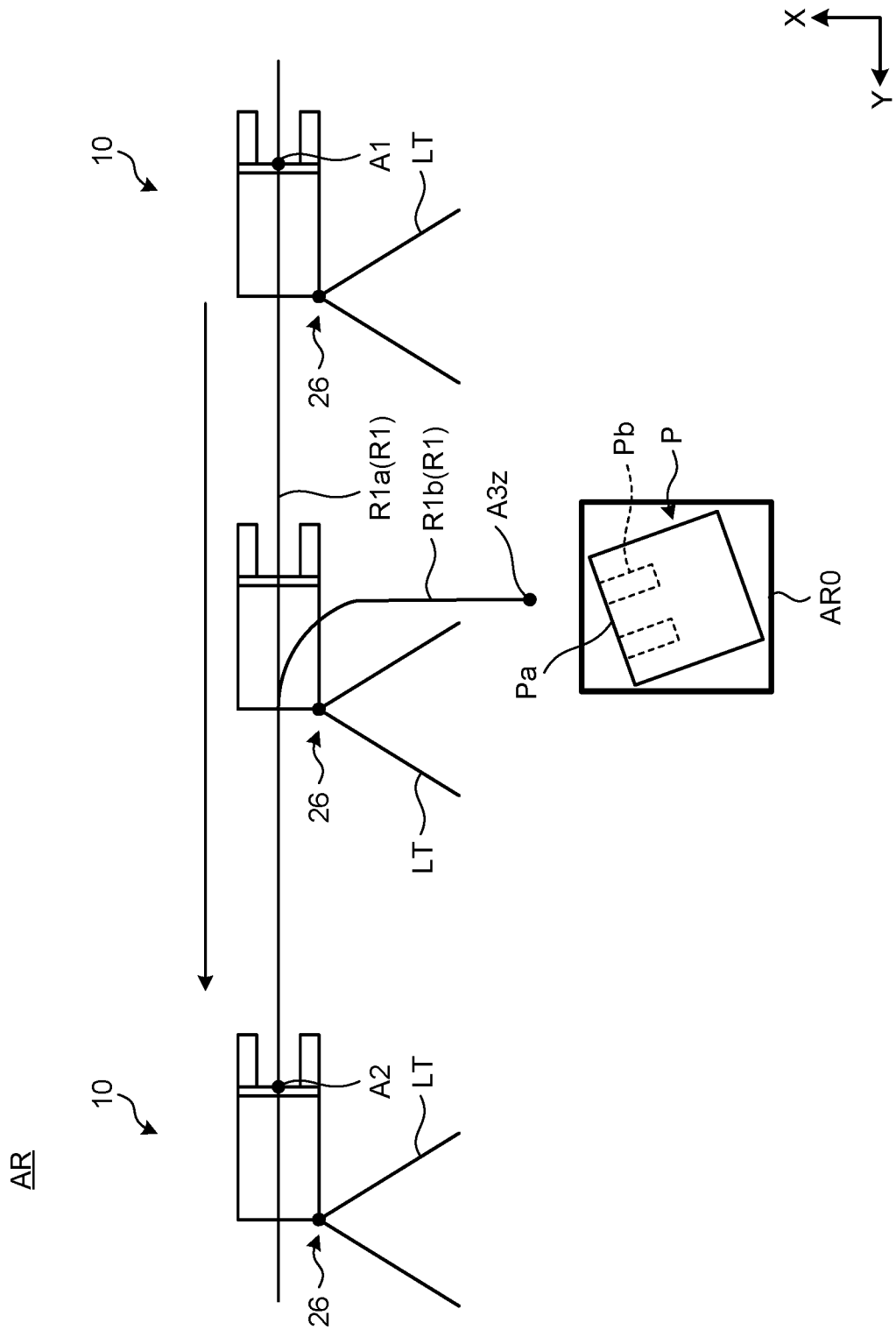
FIG. 6 is a schematic diagram for explaining a first path.

FIG. 6 is a schematic diagram for explaining the first path. As illustrated in FIG. 6, the movement control unit 72 of the control device 28 causes the mobile object 10 to move along the first path R1 acquired by the first path information acquisition unit 70. The movement control unit 72 causes the mobile object 10 to move from the current position of the mobile object 10 to the second position A2 via the first position A1 along the first path R1. It can be said that the first path R1 is a track that is set in advance irrespective of the position and the attitude of the target object P or the mobile object 10.

Detection of Target Object on First Path

As illustrated in FIG. 6, while the mobile object 10 is moving from the first position A1 to the second position A2 along the first path R1, that is, while the mobile object 10 is moving along the detection track R1a, the detection control unit 74 causes the sensor 26 to detect the position and the attitude of the target object P. The detection control unit 74 causes the sensor 26 to detect the target object P by causing the sensor 26 to perform detection toward the disposition region AR0 the position of which is known.

For example, in a case in which the sensor 26 is configured to emit laser light, the detection control unit 74 causes the sensor 26 to perform scanning in a lateral direction (horizontal direction) while causing the sensor 26 to emit laser light LT during a period in which the mobile object 10 is moving from the first position A1 to the second position A2. The target object P on the side opposite to the X-direction of the mobile object 10 reflects the laser light LT from the sensor 26. The sensor 26 receives reflected light from the target object P. The detection control unit 74 acquires a point group as a set of measuring points based on a detection result of the reflected light received by the sensor 26. The measuring point is a point indicating a position (coordinates) at which the laser light LT is reflected, and the point group indicates a set of points indicating positions at which the laser light LT is reflected. In the present embodiment, based on the detection result of the reflected light, the detection control unit 74 calculates, as the measuring point, a position (coordinates) of a point at which the reflected light is reflected. The detection control unit 74 extracts a straight line by using, for example, a RANSAC algorithm based on the measuring points (point group), and calculates a position and an attitude of the straight line as the position and the attitude of the target object P (the position and the attitude of the front surface Pa of the target object P). For example, the detection control unit 74 extracts measuring points within Regions Of Interest (ROI) close to the disposition region AR0 from among the measuring points (point group), and acquires, as a candidate for a straight line, a straight line connecting two measuring points selected from the extracted measuring points by the RANSAC algorithm. The detection control unit 74 then extracts, from among a plurality of the candidates for a straight line, for example, a candidate for the straight line having a short vertical distance to each of the measuring points as a straight line corresponding to the position and the attitude of the front surface Pa of the target object P, and calculates the position and the attitude of the target object P. However, a calculation method for the position and the attitude of the target object P based on the detection result of the sensor 26 may be optional.

The detection control unit 74 may cause the sensor 26 to detect the position and the attitude of the target object P over the entire period from when the mobile object 10 is positioned at the first position A1 until the mobile object 10 arrives at the second position A2. However, the detection control unit 74 does not necessarily cause the sensor 26 to perform detection over the entire period from when the mobile object 10 is positioned at the first position A1 until the mobile object 10 arrives at the second position A2. The detection control unit 74 may cause the sensor 26 to perform detection at least once in the period from when the mobile object 10 is positioned at the first position A1 until the mobile object 10 arrives at the second position A2, and it is more preferable to cause the sensor 26 to perform detection multiple times in this period. More specifically, the detection control unit 74 may cause the sensor 26 to continuously perform detection until the sensor 26 successfully detect the position and the attitude of the target object P while the mobile object 10 is moving from the first position A1 to the second position A2, and may cause the sensor 26 to stop the detection when the sensor 26 succeeds in the detection.

In the present embodiment, at the time of causing the mobile object 10 to move from the movement start position to the second position A2 via the first position A1 along the first path R1, the movement control unit 72 causes the mobile object 10 to move without causing the mobile object 10 to stop at the first position A1. More specifically, at the time of causing the mobile object 10 to move along the first path R1, the movement control unit 72 prevents a moving speed of the mobile object 10 from the first position A1 to the second position A2 from being changed from the moving speed of the mobile object 10 up to the first position A1. However, the movement control unit 72 may cause the mobile object 10 to temporarily stop at the first position A1. The movement control unit 72 may cause the moving speed of the mobile object 10 from the first position A1 to the second position A2 to be lower than the moving speed of the mobile object 10 up to the first position A1. By causing the moving speed of the mobile object 10 from the first position A1 to the second position A2 to be slower, the position and the attitude of the target object P can be appropriately detected.

Hereinafter, information indicating the position and the attitude of the target object P detected by the sensor 26 is referred to as position and attitude information as appropriate. It can be said that the detection control unit 74 acquires the position and attitude information detected by the sensor 26.

Setting of Second Path

Figure 7:
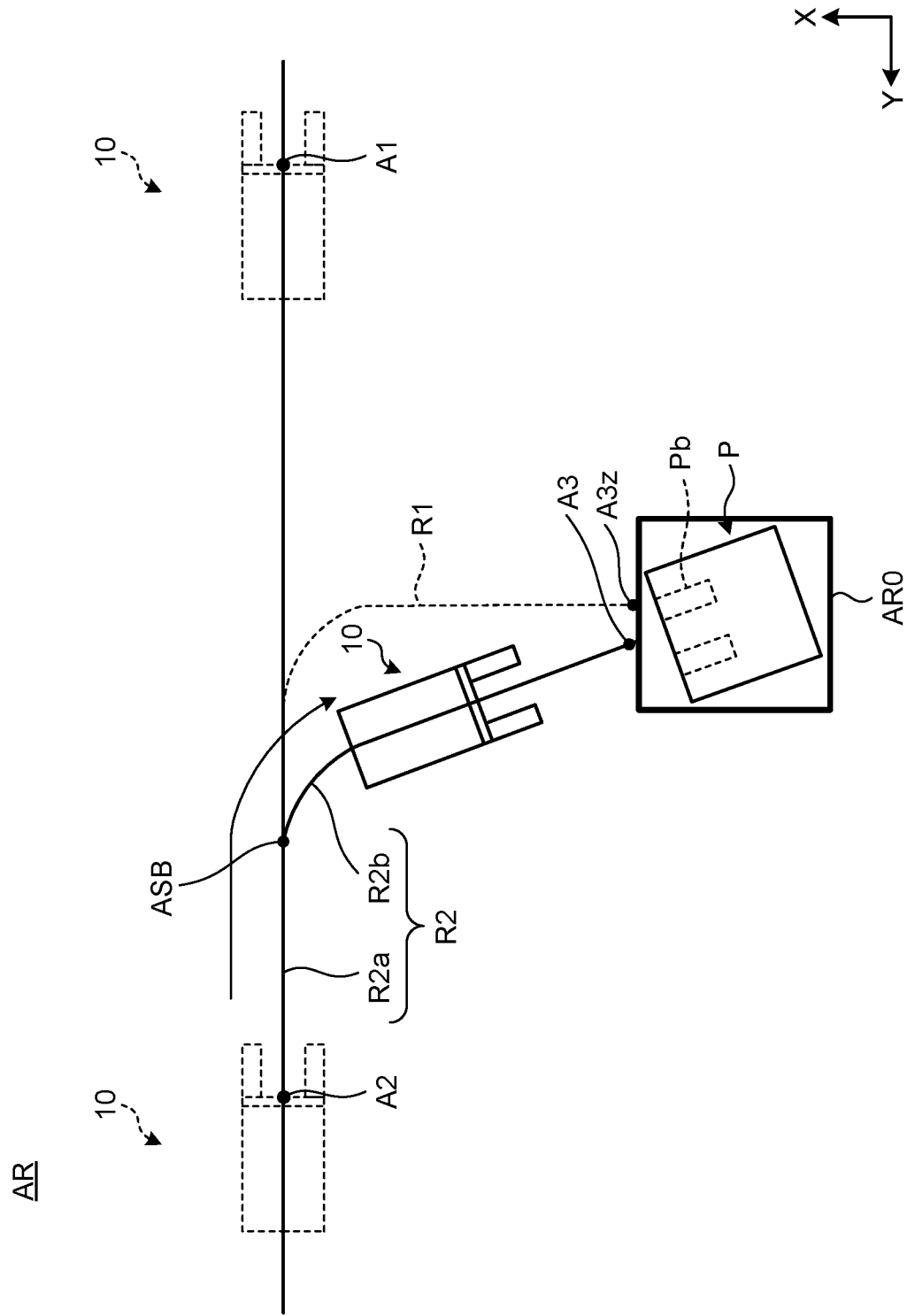
FIG. 7 is a schematic diagram for explaining a second path.

FIG. 7 is a schematic diagram for explaining the second path. The second path information acquisition unit 76 acquires information about the second path R2 that is set based on the position and attitude information detected by the sensor 26 during movement along the first path R1. As illustrated in FIG. 7, the second path R2 is a track from the second position A2 to the target position A3 that is set based on the position and attitude information on the target object P. The target position A3 is a position and an attitude that are predetermined position and attitude with respect to the target object P. In the present embodiment, the target position A3 can be assumed to be a position and an attitude at and with which the mobile object 10 can pick up the target object P. The second path R2 is not necessarily a track the starting position of which is the second position A2. For example, the second path R2 may be a track from a starting position deviated from the second position A2 to the target position A3. In this case, the mobile object 10 may move along a track set in advance (for example, the first path R1) to the starting position of the second path R2. The first path R1 and the second path R2 illustrated in FIG. 7 are merely examples. The second path R2 is set based on a coordinate system on the two-dimensional surface along the direction X and the direction Y, so that the second path R2 may be a track in the local coordinate system based on the region AR, or may be a track in the global coordinate system.

In the present embodiment, the second path information acquisition unit 76, that is, the mobile object 10 itself sets the second path R2 based on the position and attitude information detected by the sensor 26. The second path information acquisition unit 76 sets the target position A3 based on the position and attitude information that is detected by the sensor 26 during movement along the first path R1. For example, the second path information acquisition unit 76 calculates the position and the attitude at and with which the target object P can be picked up (the fork 24 can be inserted into the opening Pb of the target object P by straight movement) from the position and the attitude of the target object P, and sets the position and the attitude as the target position A3. By way of example, a point translated from an entrance of the opening Pb by 1000 mm in an axis direction of the opening Pb of the target object P may be assumed to be the target position A3. The second path information acquisition unit 76 then sets, as the second path R2, a track from the second position A2 being a starting position to the set target position A3.

In the present embodiment, the second path information acquisition unit 76 sets the second path R2 to include a linear track R2a and a circular arc track R2b based on the position and the attitude of the target object P. The linear track R2a is a track depicting a linear-shaped locus. The linear track R2a is a track from the second position A2 as a starting position of the second path R2 to an intermediate position ASB. The intermediate position ASB is positioned between the first position A1 and the second position A2 on the first path R1. That is, the linear track R2a is a track overlapping the first path R1 (more specifically, the detection track R1a) from the second position A2 to the intermediate position ASB, and a traveling direction thereof is opposite to that of the detection track R1a. The circular arc track R2b is a track including a track depicting a locus having a circular arc shape. Assuming that a radius of the circular arc-shaped locus of the circular arc track R2b is a turning radius r, the second path information acquisition unit 76 sets the turning radius r, and sets the circular arc track R2b based on the set turning radius r, and the position and the attitude of the target object P. The turning radius r may be optionally set based on vehicle specifications, for example.

The circular arc track R2b is a track connected to the linear track R2a, and is a track from the intermediate position ASB to the target position A3. Thus, the circular arc track R2b is a track proceeding toward an opposite direction of the X-direction, in other words, toward a side closer to the disposition region AR0 (target object P) in the direction orthogonal to the Y-direction. In the example of FIG. 7, the circular arc track R2b includes a circular arc-shaped track from the intermediate position ASB to an intermediate position between the intermediate position ASB and the target position A3, and a linear-shaped track from the intermediate position to the target position A3. However, the circular arc track R2b may be a track having a circular arc shape over the entire section from the intermediate position ASB to the target position A3. That is, the circular arc track R2b may be constituted of the circular arc-shaped track and the linear-shaped track, or may be constituted of only the circular arc-shaped track. It is preferable that the circular arc track R2b does not include a track depicting a locus other than a circular arc and a straight line (nonlinear track).

The second path R2 is not limited to the track including the linear track R2a and the circular arc track R2b as described above, but may be an optional track to the target position A3 that is set based on the position and attitude information detected by the sensor 26 during movement along the first path R1. In the present embodiment, the second path R2 is not updated after being set once. It is preferable that the second path R2 is not set again while the mobile object 10 is moving along the second path R2.

Movement Along Second Path

In the present embodiment, when the mobile object 10 arrives at the second position A2, the movement control unit 72 temporarily stops movement of the mobile object 10. When the mobile object 10 stops at the second position A2, the second path information acquisition unit 76 starts to perform an arithmetic operation, and acquires the second path R2. When the second path R2 is acquired, the movement control unit 72 switches a route to be used from the first path R1 to the second path R2, and causes the mobile object 10 to move from the second position A2 toward the target position A3 to pass through the second path R2. The movement control unit 72 successively detects the position and the attitude of the mobile object 10, and causes the mobile object 10 to move so that the position and the attitude of the mobile object 10 run along the second path R2, that is, follow the second path R2 (route following control). Specifically, the movement control unit 72 causes the mobile object 10 to turn back at the second position A2, and move from the second position A2 to the intermediate position ASB along the linear track R2a of the second path R2 in the opposite direction of the detection track R1a of the first path R1, that is, the opposite direction of the direction Y. When the mobile object 10 arrives at the intermediate position ASB, the movement control unit 72 switches the linear track R2a to the circular arc track R2b, that is, changes the traveling direction, and causes the mobile object 10 to move toward the target position A3 along the circular arc track R2b.

The movement control unit 72 does not necessarily stop the movement of the mobile object 10 at the second position A2. In this case, for example, when the position and attitude information on the target object P is acquired, the second path information acquisition unit 76 acquires the second path R2 during movement from the first position A1 to the second position A2, that is, before the mobile object 10 arrives at the second position A2. When the mobile object 10 passes through the first path R1 and arrives at the second position A2, the movement control unit 72 switches the first path R1 to the second path R2 without stopping the mobile object 10 at the second position A2 (except a stop time that is required to switch the traveling direction), and causes the mobile object 10 to move from the second position A2 to pass through the second path R2.

Depending on the position and the attitude of the target object P, the mobile object 10 may approach the target object P by continuously using the first path R1 without switching the first path R1 to the second path R2. In this case, the second path information acquisition unit 76 determines whether the second path R2 is required to be set based on the position and attitude information on the target object P detected by the sensor 26. The second path information acquisition unit 76 determines that the second path R2 is not required to be set in a case in which the position and the attitude of the target object P fall within a predetermined range, and determines that the second path R2 is required to be set in a case in which the position and the attitude of the target object P is out of the predetermined range. "Fall within the predetermined range" means that misalignment of the position and the attitude of the target object P with respect to the disposition region AR0 is small. In a case in which the position and the attitude of the target object P fall within the predetermined range, the mobile object 10 can arrive at the target position A3 at which the target object P can be picked up, by using the approach track R1b (refer to FIG. 1) of the first path R1. In other words, the second path information acquisition unit 76 determines whether the target object P can be picked up if the mobile object 10 moves toward the set position A3z as an arrival position of the approach track R1b based on the position and attitude information of the target object P. In a case in which the position and the attitude of the target object P fall within the predetermined range, the second path information acquisition unit 76 determines that the target object P can be picked up at the set position A3z and the second path R2 is not required to be set. On the other hand, in a case in which the position and the attitude of the target object P are out of the predetermined range, the second path information acquisition unit 76 determines that the target object P cannot be picked up at the set position A3z and the second path R2 is required to be set. The predetermined range herein may be set by using an optional method based on information on vehicle specifications and the like, and may be calculated in advance.

In a case in which the second path information acquisition unit 76 determines that the second path R2 is not required to be set, the movement control unit 72 causes the mobile object 10 to move from the second position A2 toward the set position A3z while passing through the approach track R1b of the first path R1 by continuously using the first path R1. On the other hand, in a case in which the second path information acquisition unit 76 determines that the second path R2 is required to be set, the movement control unit 72 switches the first path R1 to the second path R2 as described above, and causes the mobile object 10 to move toward the target position A3.

Setting of Third Path

Figure 8:
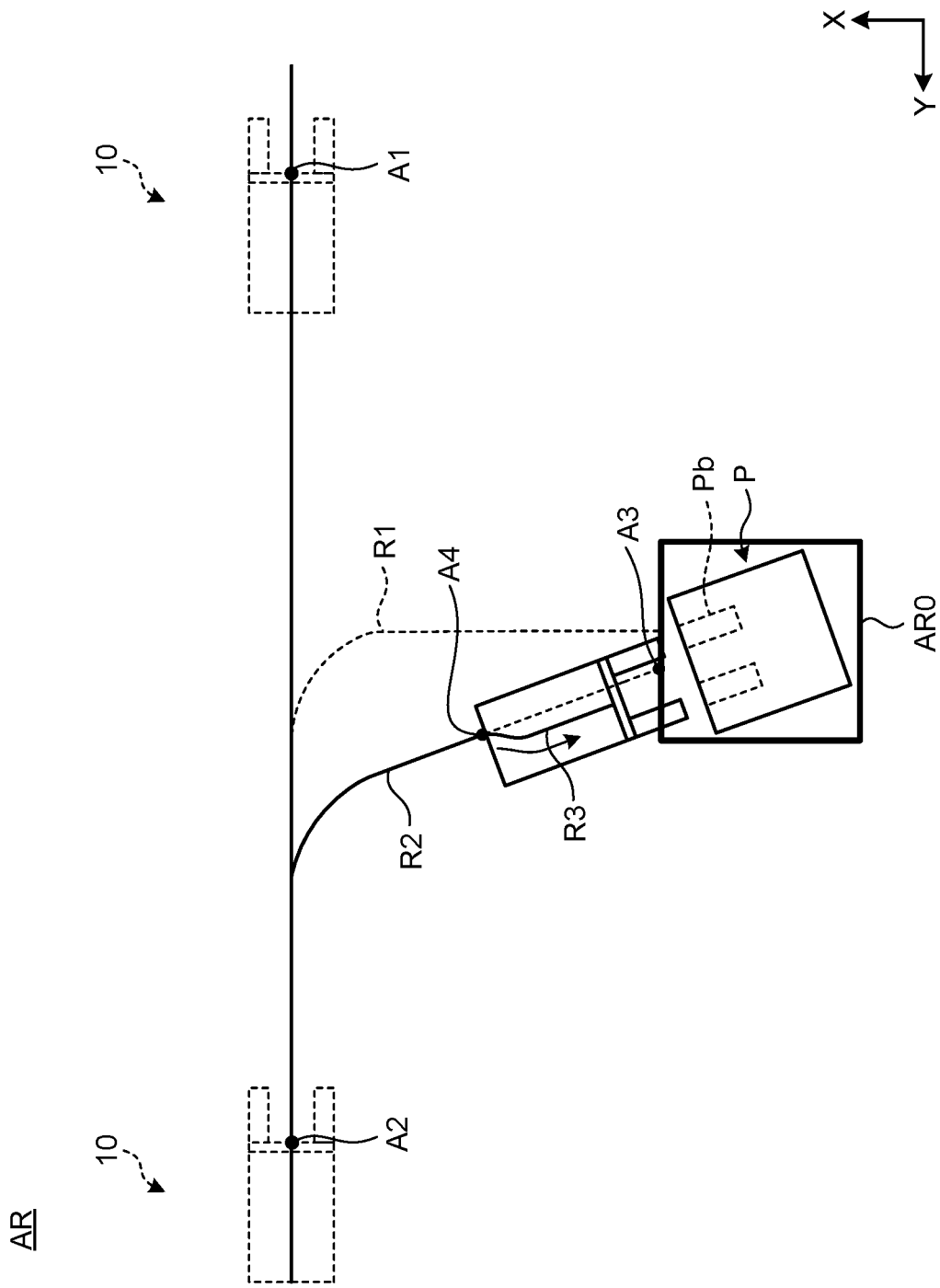
FIG. 8 is a schematic diagram for explaining a third path.

FIG. 8 is a schematic diagram for explaining the third path. As described above, the second path R2 is the route to the target position A3 at which the target object P can be picked up, so that the mobile object 10 can arrive at the target position A3 and pick up the target object P by moving along the second path R2. However, there is the possibility that the mobile object 10 cannot arrive at the position at which the target object P can be picked up for the reason that the mobile object 10 deviates from the second path R2 due to influence of disturbance and the like, or the reason that there is an error in the detection result obtained by the sensor 26 that is used for setting the second path R2. On the other hand, as illustrated in FIG. 8, the mobile object 10 according to the present embodiment can approach the target object P with high accuracy by switching the second path R2 to the third path R3 when the mobile object 10 comes closer to the target object P to be able to appropriately detect the target object P with the sensor 26 while moving along the second path R2, and approaching the target object P along the third path R3. The following describes the third path R3.

In the present embodiment, the third path information acquisition unit 78 sets the third path R3 when the mobile object 10 moving along the second path R2 arrives at a detection enabled position A4 at which the target object P can be continuously and appropriately detected with the sensor 26. That is, the detection control unit 74 causes the sensor 26 to detect the target object P even while the mobile object 10 is moving along the second path R2. The third path information acquisition unit 78 then acquires a detection result of the position and the attitude of the target object P obtained by the sensor 26 at the detection enabled position A4. The third path information acquisition unit 78 also acquires a detection result of the position and the attitude of the mobile object 10. The third path information acquisition unit 78 then sets the third path R3 by executing optimization calculation based on an evaluation function with which an evaluation becomes higher as a deviation between the position of the target object P and the position of the mobile object 10 becomes smaller. That is, the third path information acquisition unit 78 calculates a route from the current position of the mobile object 10 to be closer to the target object P by optimization calculation, and sets the route as the third path R3. The detection enabled position A4 as a position at which the path is switched to the third path R3 may be set based on an optional standard.

The sensor 26 that detects the target object P at the time of setting the third path R3 is the same as the sensor 26 that is used at the time of setting the second path R2, but is not limited thereto, and may be a sensor different from the sensor 26 that is used at the time of setting the second path R2.

Movement Along Third Path

When the mobile object 10 moving along the second path R2 arrives at the detection enabled position A4 and the third path R3 is set, the movement control unit 72 switches the route to be used from the second path R2 to the third path R3, and causes the mobile object 10 to move along the third path R3. In a case of causing the mobile object 10 to move along the third path R3, the movement control unit 72 does not perform route following control unlike for the second path R2. The third path information acquisition unit 78 acquires a detection result of the position and the attitude of the target object P obtained by the sensor 26 and a detection result of the position and the attitude of the mobile object 10 at predetermined cycles, and updates the third path R3. Every time the third path R3 is updated, the movement control unit 72 switches the path to the updated third path R3, and causes the mobile object 10 to move along the updated third path R3. In this way, by successively updating the third path R3, route following control becomes unnecessary.

In a case in which the mobile object 10 continuously moves along the first path R1 without using the second path R2, the movement control unit 72 switches the first path R1 to the third path R3 when the mobile object 10 arrives at the detection enabled position A4. In this case, a switching method for the third path R3 and a setting method for the third path R3 are the same as those in the case of switching the second path R2 to the third path R3 described above.

Switching from the second path R2 (or the first path R1) to the third path R3 is not indispensable. For example, while the mobile object 10 is moving along the second path R2 (or the first path R1), in a case in which the mobile object 10 arrives at a switching position A5 (described later) while it is not determined that the mobile object 10 arrives at the detection enabled position A4, the second path R2 (or the first path R1) may be switched to the fourth path R4. Also in the case of not switching the path to the third path R3 as described above, whether the mobile object 10 arrives at the detection enabled position A4 is determined, so that determination itself on whether to switch the second path R2 (or the first path R1) to the third path R3 is made.

Setting of Fourth Path

Figure 9:
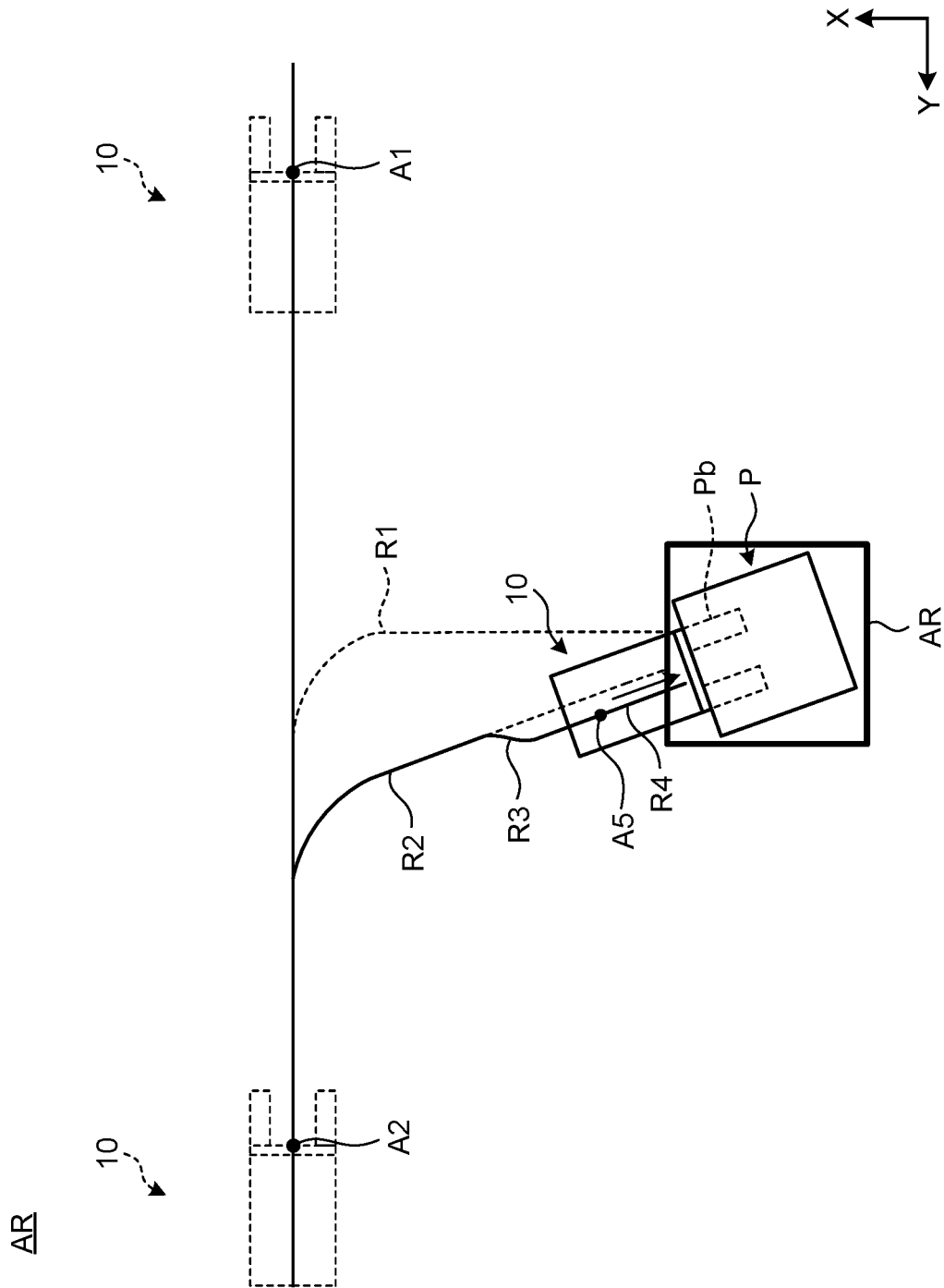
FIG. 9 is a schematic diagram for explaining a fourth path.

FIG. 9 is a schematic diagram for explaining the fourth path. As illustrated in FIG. 9, the fourth path information acquisition unit 80 sets the fourth path R4 when the mobile object 10 moving along the third path R3 arrives at the switching position A5 as a position that is sufficiently close to the target object P. More specifically, when the mobile object 10 arrives at the switching position A5, the detection control unit 74 causes the sensor 26 to detect the position and the attitude of the target object P. The switching position A5 may be set based on an optional standard. By performing feedback control (direct feedback control) based on a detection result of at least one of the position and the attitude of the target object P and a detection result of at least one of the position and the attitude of the mobile object 10, the fourth path information acquisition unit 80 sets the fourth path R4 for causing the mobile object 10 to approach the target object P. That is, the fourth path information acquisition unit 80 sets the fourth path R4 by performing feedback control based on at least one of relative positions of the target object P and the mobile object 10 and relative attitudes of the target object P and the mobile object 10. In the present embodiment, the fourth path information acquisition unit 80 sets the fourth path R4 by performing feedback control based on both of the relative positions of the target object P and the mobile object 10 and the relative attitudes of the target object P and the mobile object 10. That is, it can be said that the fourth path R4 is a route on which feedback control is performed on the position and the attitude of the mobile object 10 so that the position and the attitude of the mobile object 10 match the position and the attitude of the target object P by successively detecting the positions and the attitudes of the mobile object 10 and the target object P.

The sensor 26 that detects the target object P at the time of setting the fourth path R4 is the same as the sensor 26 that is used at the time of setting the second path R2 or the third path R3, but is not limited thereto, and may be a sensor different from the sensor 26 that is used at the time of setting the second path R2 or the third path R3.

Movement Along Fourth Path

When the mobile object 10 moving along the third path R3 arrives at the switching position A5 and the fourth path R4 is set, the movement control unit 72 switches the route to be used from the third path R3 to the fourth path R4, and causes the mobile object 10 to move along the fourth path R4. The fourth path information acquisition unit 80 acquires a detection result of the position and the attitude of the target object P obtained by the sensor 26 and a detection result of the position and the attitude of the mobile object 10 at predetermined cycles, and updates the fourth path R4. Every time the fourth path R4 is updated, the movement control unit 72 switches the path to the updated fourth path R4, and causes the mobile object 10 to move along the updated fourth path R4. The mobile object 10 moves along the fourth path R4, arrives at the target object P, inserts the fork 24 into the opening Pb, and picks up the target object P. The movement control unit 72 causes the mobile object 10 that has picked up the target object P to convey the target object P to a set conveyance destination.

In a case in which the mobile object 10 arrives at the switching position A5 during movement along the second path R2 (or the first path R1) without using the third path R3, the movement control unit 72 switches the second path R2 (or the first path R1) to the fourth path R4. In this case, a switching method for the fourth path R4 and a setting method for the third path R3 are the same as those in the case of switching the third path R3 to the fourth path R4 described above.

Switching to the fourth path R4 is not indispensable, and the movement control unit 72 may cause the mobile object 10 to move by using at least one of the first path R1, the second path R2, and the third path R3.

Movement Control Flow

Figure 10:
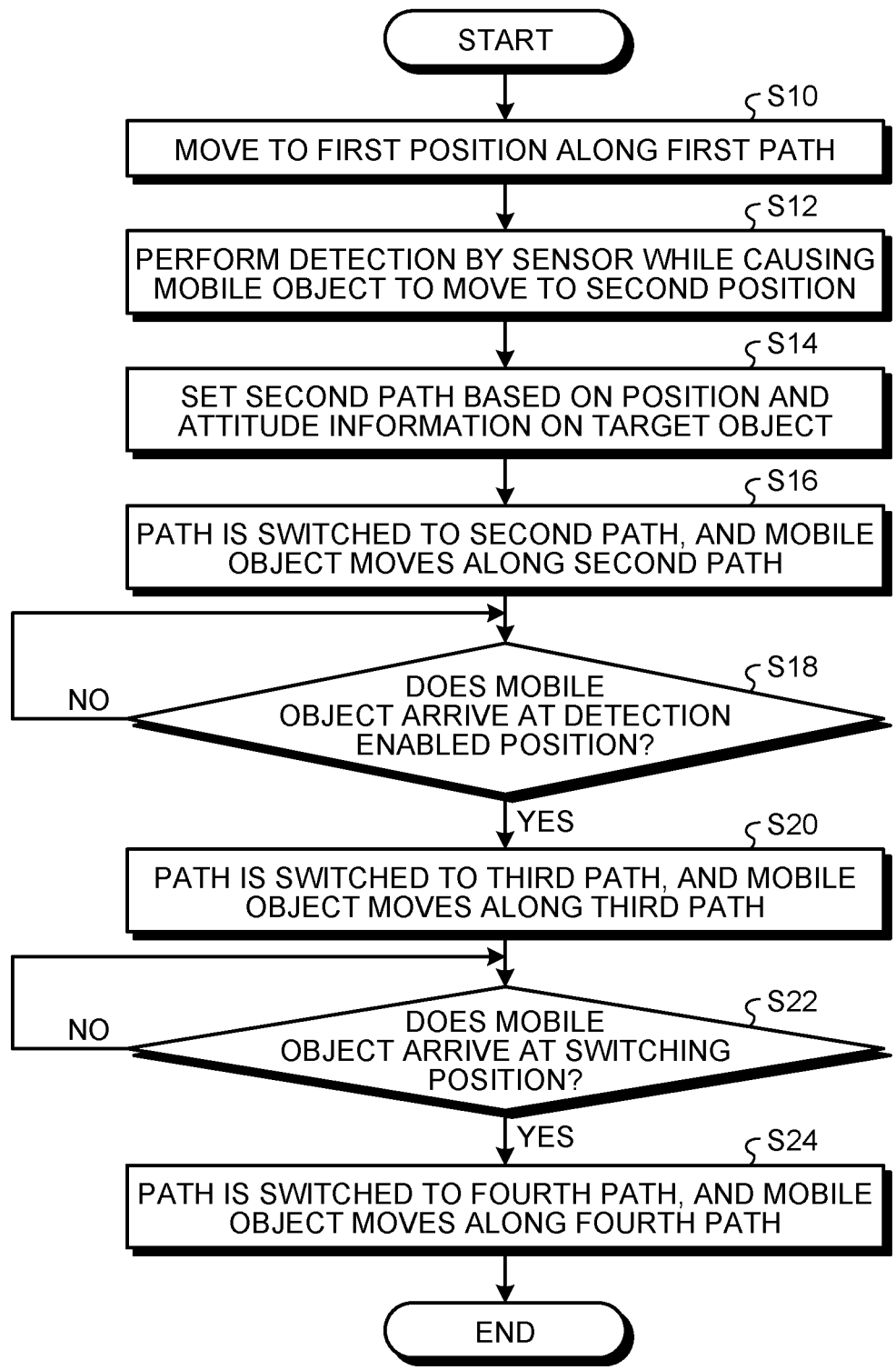
FIG. 10 is a flowchart for explaining a movement control flow for the mobile object according to the first embodiment.

The following describes a movement control flow for the mobile object 10 described above based on a flowchart. FIG. 10 is a flowchart for explaining the movement control flow for the mobile object according to the first embodiment. As illustrated in FIG. 10, the control device 28 of the mobile object 10 acquires information about the first path R1 by the first path information acquisition unit 70, and causes the mobile object 10 to move to the first position A1 along the first path R1 by the movement control unit 72 (Step S10). While causing the mobile object 10 to move from the first position A1 to the second position A2 along the first path R1 (detection track R1a) by the movement control unit 72, the control device 28 causes the sensor 26 to detect the position and attitude information on the target object P by the detection control unit 74 (Step S12). The control device 28 then sets the second path R2 by the second path information acquisition unit 76 based on the detection result of the position and attitude information on the target object P moving along the first path R1 (Step S14). The control device 28 switches the first path R1 to the second path R2 by the movement control unit 72, and causes the mobile object 10 to move along the second path R2 (Step S16).

While the mobile object 10 is moving along the second path R2, if the mobile object 10 arrives at the detection enabled position A4 at which the target object P can be appropriately detected by the sensor 26 (Yes at Step S18), the control device 28 sets the third path R3 by optimization calculation by the third path information acquisition unit 78, switches the second path R2 to the third path R3 by the movement control unit 72, and causes the mobile object 10 to move along the third path R3 (Step S20). The control device 28 causes the mobile object 10 to move along the third path R3 while successively updating the third path R3. If the mobile object 10 does not arrive at the detection enabled position A4 while moving along the second path R2 (No at Step S18), the process returns to Step S18, and the mobile object 10 continuously moves along the second path R2 until arriving at the detection enabled position A4.

If the mobile object 10 arrives at the switching position A5 while moving along the third path R3 (Yes at Step S22), the control device 28 sets the fourth path R4 by feedback control performed by the fourth path information acquisition unit 80, switches the third path R3 to the fourth path R4 by the movement control unit 72, and causes the mobile object 10 to move along the fourth path R4 (Step S24). The control device 28 causes the mobile object 10 to arrive at the target object P by causing the mobile object 10 to move along the fourth path R4 while successively updating the fourth path R4. If the mobile object 10 does not arrive at the switching position A5 while moving along the third path R3 (No at Step S22), the process returns to Step S22, and the mobile object 10 continuously moves along the third path R3 until arriving at the switching position A5.

Effects

As described above, the mobile object 10 according to the present embodiment can appropriately approach the target object P (target position) by approaching the target object P while switching a moving route among the first path R1, the second path R2, the third path R3, and the fourth path R4. More specifically, by using the second path R2 that is set based on the position and attitude information on the target object P, which is detected during movement along the first path R1, the mobile object 10 can appropriately approach the target object P in accordance with the actual position and attitude of the target object P even if the position or the attitude of the target object P is deviated from the disposition region AR0, for example. Furthermore, even in a case in which the mobile object 10 deviates from the second path R2 due to influence of disturbance and the like, or a case in which there is an error in the detection result obtained by the sensor 26 that is used for setting the second path R2, the mobile object 10 can appropriately approach the target object P by switching the path to the third path R3 using optimization calculation. Furthermore, by switching the path to the fourth path R4 of a servo type at the switching position A5 closer to the target object P, the mobile object 10 can come closer to the target object P while making fine adjustments immediately before arriving at the target object P.

In the above description, the information processing device 14 sets the first path R1, and the control device 28 of the mobile object 10 sets the second path R2, the third path R3, and the fourth path R4. However, a device that sets each path is not limited thereto, and may be optional. For example, the first path R1 may be set by the control device 28 of the mobile object 10. Alternatively, for example, at least one of the second path R2, the third path R3, and the fourth path R4 may be set by a device other than the control device 28 (for example, the information processing device 14), and the control device 28 may acquire information on at least one of the second path R2, the third path R3, and the fourth path R4 from this device.

In the above description, the mobile object 10 moves to the second position A2 assuming that the rear direction in which the fork 24 is not disposed is a forward side of the traveling direction, turns back at the second position A2, and approaches the target object P assuming that the front direction in which the fork 24 is disposed is the forward side of the traveling direction. However, orientation of the mobile object 10 at the time of movement is not limited thereto. Also in the movement to the second position A2, the mobile object 10 may move assuming that the front direction in which the fork 24 is disposed is the forward side of the traveling direction.

Another Example of Second Path

Next, the following describes another example of the second path R2. In this example, it is determined whether the second path R2 is required to be turned back while bulging toward an opposite direction (X-direction side) of the target object P. Specific description will be made hereinafter.

Figure 11:
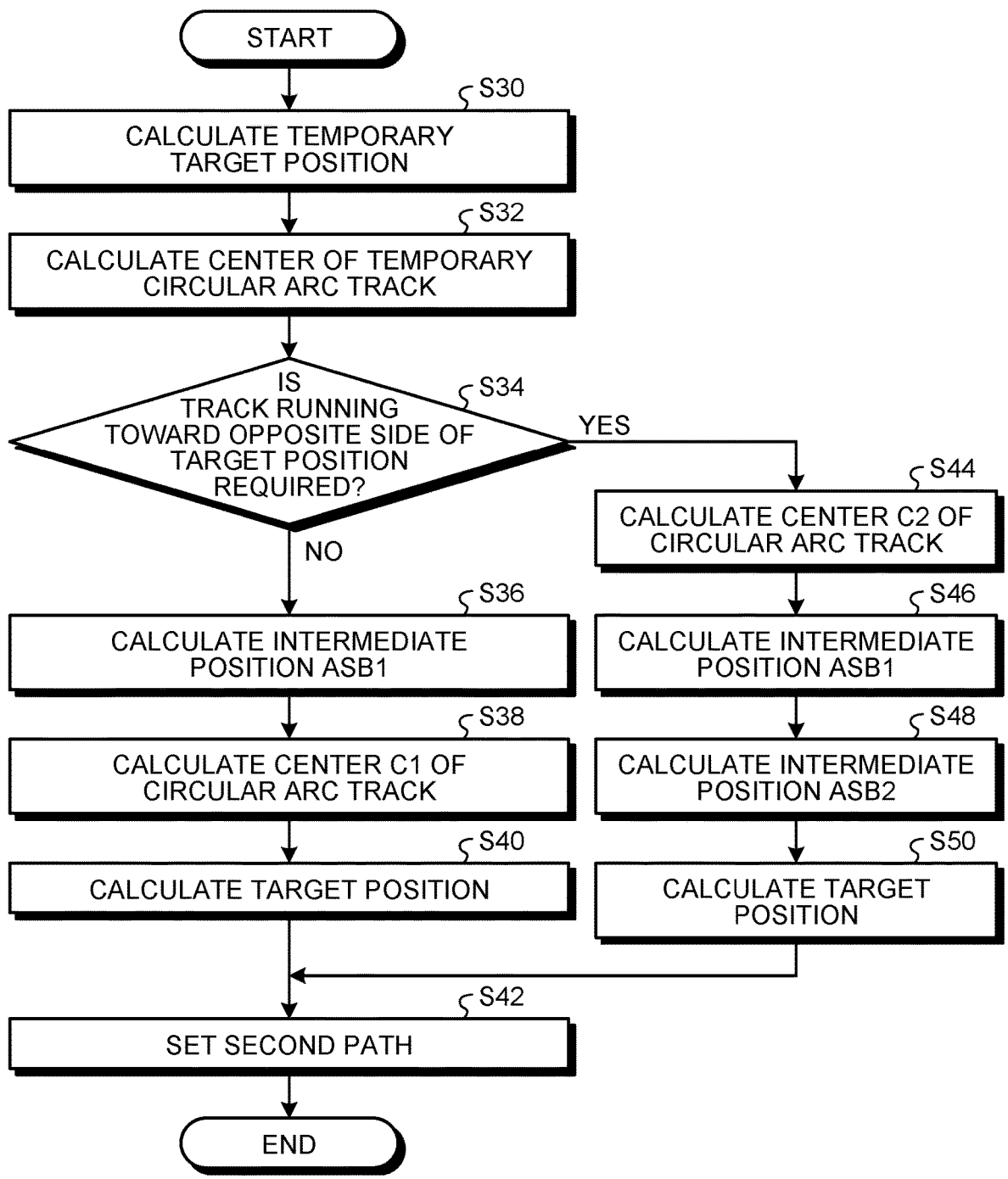
FIG. 11 is a flowchart illustrating a setting flow for the second path according to an example.
Figure 12:
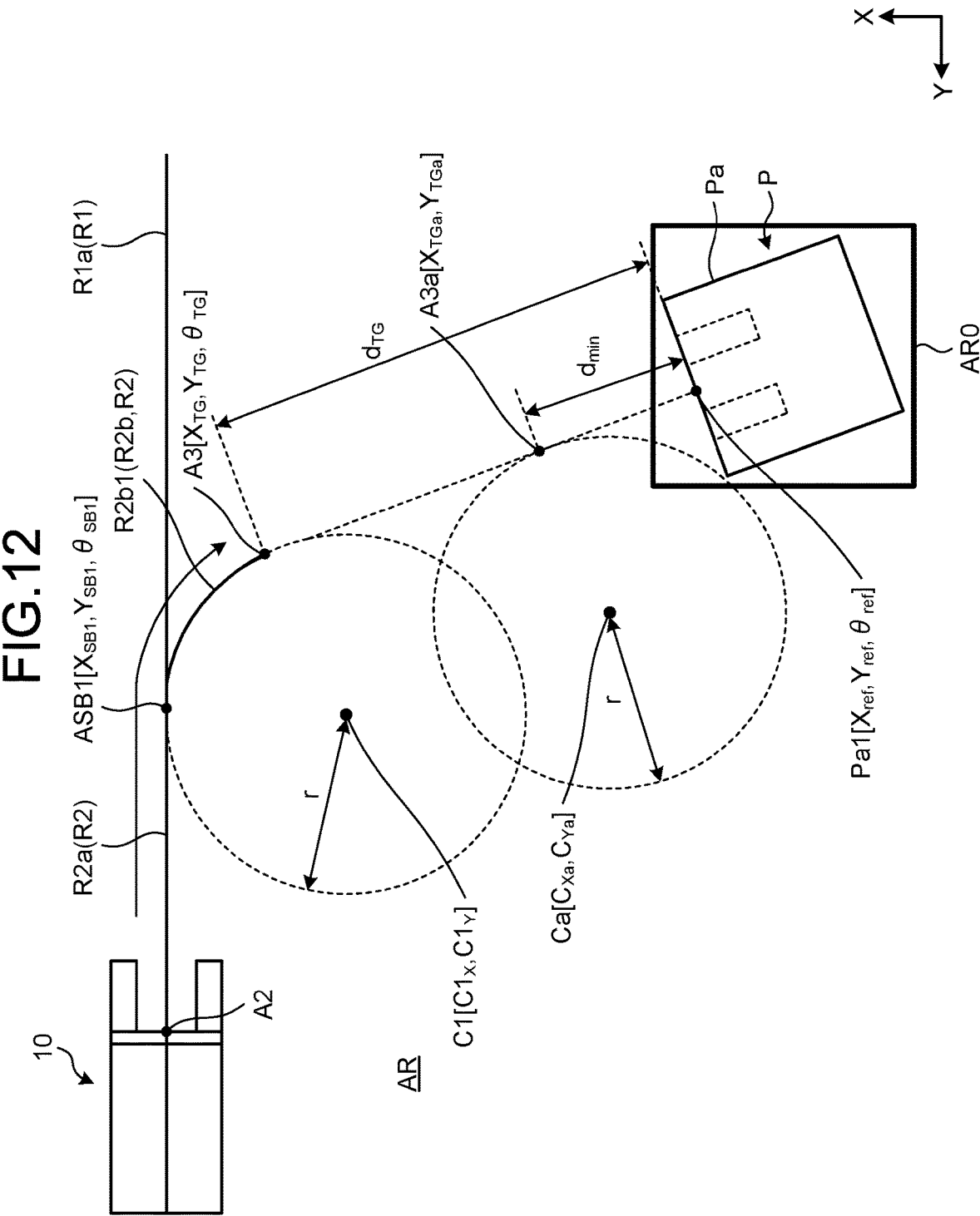
FIG. 12 is a schematic diagram for explaining a case of setting a single circular arc path as the second path.

FIG. 11 is a flowchart illustrating a setting flow for the second path according to this example. FIG. 12 is a schematic diagram for explaining a case of setting a single circular arc path as the second path. In the following description, as illustrated in FIG. 12, the position of the target object P is assumed to be a position Pa1. Coordinates of the position Pa1 in the direction X and the direction Y are respectively assumed to be $X_{ref}$ and $Y_{ref}$, and the attitude (rotation angle) of the target object P at the position Pa1 is assumed to be $\theta_{ref}$. [$X_{ref}$, $Y_{ref}$, $\theta_{ref}$] corresponds to the position and the attitude of the target object P detected by the sensor 26. The position Pa1 is a center position of the front surface Pa of the target object P in the example of FIG. 12, but the position Pa1 is not limited to the center position of the front surface Pa, and may be a position of an optional point of the target object P. As illustrated in FIG. 12, coordinates in the direction X and the direction Y of the target position A3 as an ending point of the second path R2 are respectively assumed to be $X_{TG}$ and $Y_{TG}$, and the attitude (rotation angle) of the mobile object 10 at the target position A3 is assumed to be $\theta_{TG}$. [$X_{TG}$, $Y_{TG}$, $\theta_{TG}$] is calculated based on [$X_{ref}$, $Y_{ref}$, $\theta_{ref}$] corresponding to the position and the attitude of the target object P, and the second path R2 is set based on [$X_{TG}$, $Y_{TG}$, $\theta_{TG}$]. The following describes the setting flow for the second path R2.

As illustrated in FIG. 11, in this example, at the time of setting the second path R2, the second path information acquisition unit 76 calculates coordinates of a temporary target position A3a based on the position and attitude information of the target object P (Step S30). As illustrated in FIG. 12, the temporary target position A3a is a position separated from the position Pa1 of the target object P by a predetermined distance $d_{min}$ along a direction in which the front surface Pa of the target object P faces. The distance $d_{min}$ is set in advance, and determined in accordance with a length of a final linear track to be left for picking up the target object P. Assuming that the coordinates in the direction X and the direction Y of the temporary target position A3a are respectively $X_{TGa}$ and $Y_{TGa}$, $X_{TGa}$ and $Y_{TGa}$ are calculated based on the following Equations (1) and (2).

$$X_{TGa} = X_{ref} + d_{min} \cdot \cos\theta_{ref} \qquad (1)$$

$$Y_{TGa} = Y_{ref} + d_{min} \cdot \sin\theta_{ref} \qquad (2)$$

As illustrated in FIG. 11, the second path information acquisition unit 76 then calculates coordinates of a center Ca of a temporary circular arc track based on the coordinates of the temporary target position A3a and the position and attitude information on the target object P (Step S32). As illustrated in FIG. 12, the center Ca of the temporary circular arc track indicates a center of a circle that is positioned on the second position A2 side (herein, on the Y-direction side) with respect to the temporary target position A3a and the position Pal of the target object P, the circle having a radius as the turning radius r and a circumference touching the temporary target position A3a. Assuming that coordinates in the direction X and direction Y of the center Ca of the temporary circular arc track are respectively $C_{Xa}$ and $C_{Ya}$, $C_{Xa}$ and $C_{Ya}$ are calculated based on the following Equations (3) and (4).

$$C_{Xa} = X_{TGa} - r \cdot \sin \theta_{ref} \quad (3)$$

$$C_{Ya} = Y_{TGa} - r \cdot \cos \theta_{ref} \quad (4)$$

As illustrated in FIG. 11, the second path information acquisition unit 76 then determines whether the second path R2 requires a track toward the opposite side of the target position A3 (disposition region AR0), that is, whether the second path R2 requires a track toward the X-direction side, based on the position and attitude information on the target object P (Step S34). In other words, the second path information acquisition unit 76 determines whether the second path R2 is required to be turned back while bulging toward the opposite direction (X-direction side) of the target object P to arrive at the target object P. In the present embodiment, the second path information acquisition unit 76 determines whether the track toward the opposite side of the target position A3 is required based on a coordinate $X_{SB1}$ in the X-direction of the detection track R1a of the first path R1 (refer to FIG. 12), a coordinate $C_{Xa}$ in the X-direction of the center Ca of the temporary circular arc track, and the turning radius r. Specifically, the second path information acquisition unit 76 determines that the track toward the opposite side of the target position A3 is required in a case in which the following Equation (5) is satisfied, and determines that the track toward the opposite side of the target position A3 is not required in a case in which Equation (5) is not satisfied.

$$X_{SB1} < C_{Xa} + r \quad (5)$$

That is, it is determined that Equation (5) is satisfied in a case in which the position that is moved in the direction X by a distance corresponding to the length of the turning radius r from the coordinate $C_{Xa}$ of the center Ca of the temporary circular arc track is present on the X-direction side with respect to the coordinate $X_{SB1}$ of the detection track R1a, and that Equation (5) is not satisfied in a case in which the position is not present on the X-direction side with respect to the coordinate $X_{SB1}$ of the detection track R1a (a case in which the position is present at the same position as the coordinate $X_{SB1}$ in the X-direction, or present on the opposite side of the X-direction with respect to the coordinate $X_{SB1}$) As illustrated in FIG. 12, an intermediate position ASB1 at which the linear track R2a is switched to the circular arc track R2b is present on the detection track R1a, so that it can be said that the coordinate $X_{SB1}$ is a coordinate in the X-direction of the intermediate position ASB1. The coordinate $X_{SB1}$ is acquired by the first path information acquisition unit 70 as information about the first path R1.

Setting of Single Circular Arc Path

As illustrated in FIG. 11, if it is determined that the track toward the opposite side of the target position A3 is not required (No at Step S34), the second path information acquisition unit 76 sets a single circular arc path including one circular arc track R2b as the second path R2. In this case, the second path information acquisition unit 76 calculates the coordinates of the intermediate position ASB1 based on the position and attitude information on the target object P and the turning radius r (Step S36). The coordinate $X_{SB1}$ in the X-direction of the intermediate position ASB1 is known as described above, and an attitude $\theta S_{B1}$ of the mobile object 10 at the intermediate position ASB1 is also known because the mobile object 10 moves along the linear track R2a overlapping the detection track R1a. Thus, the second path information acquisition unit 76 calculates a coordinate $Y_{SB1}$ in the direction Y of the intermediate position ASB1 herein. In the present embodiment, the second path information acquisition unit 76 calculates the coordinate $Y_{SB1}$ of the intermediate position ASB1 based on the coordinates of the center Ca of the temporary circular arc track, the coordinate $X_{SB1}$, and the turning radius r. Specifically, the second path information acquisition unit 76 calculates the coordinate $Y_{SB1}$ of the intermediate position ASB1 by using the following Equation (6).

$$Y_{SB1} = C_{Ya} + (X_{SB1} - C_{Xa} - r) \cdot \sin \theta_{ref} \quad (6)$$

As illustrated in FIG. 11, the second path information acquisition unit 76 calculates coordinates of a center C1 of a circular arc track based on the coordinates of the intermediate position ASB1 and the turning radius r (Step S38). As illustrated in FIG. 12, the center C1 of the circular arc track indicates a center of a locus depicting a circular arc of the circular arc track R2b in the second path R2 (single circular arc path) to be set. Assuming that coordinates in the direction X and the direction Y of the center C1 of the circular arc track are respectively $C1_X$ and $C1_Y$, $C1_X$ and $C1_Y$ are calculated based on the following Equations (7) and (8).

$$C1_X = X_{SB1} - r \quad (7)$$

$$C1_Y = Y_{SB1} \quad (8)$$

As illustrated in FIG. 11, the second path information acquisition unit 76 then calculates the position and the attitude at the target position A3 based on the coordinates of the center C1 of the circular arc track and the position and attitude information on the target object P (Step S40). The second path information acquisition unit 76 calculates [$X_{TG}$, $Y_{TG}$, $\theta_{TG}$] as the position and the attitude at the target position A3 by using the following Equations (9) to (11).

$$X_{TG} = C1_X + r \cdot \cos \theta_{ref} \quad (9)$$

$$Y_{TG} = C1_Y + r \cdot \sin \theta_{ref} \quad (10)$$

$$\theta_{TG} = \theta_{ref} \quad (11)$$

As illustrated in FIG. 11, the second path information acquisition unit 76 calculates the second path R2 based on [$X_{TG}$, $Y_{TG}$, $\theta_{TG}$] as the position and the attitude at the target position A3 (Step S42). That is, the second path information acquisition unit 76 sets the linear track R2a from the second position A2 to the intermediate position ASB1 based on the coordinates of the second position A2 and the coordinates of the intermediate position ASB1, and sets the circular arc track R2b from the intermediate position ASB1 to the target position A3 based on the position and the attitude at the intermediate position ASB1, the position and the attitude at the target position A3, and the turning radius r. In this way, the second path R2 as the single circular arc path is constituted of the linear track R2a, and the circular arc track R2b that is connected to the linear track R2a and runs toward the disposition region AR0 side (that is, the opposite direction side of the X-direction).

The method described above is a setting method in a case in which the second path R2 is the single circular arc path without a track bulging toward the X-direction side. In a case of using the single circular arc path as the second path R2, the mobile object 10 moves from the second position A2 to the intermediate position ASB1 along the linear track R2a, switches the linear track R2a to the circular arc track R2b, that is, changes the traveling direction at the intermediate position ASB1, and moves toward the target position A3 along the circular arc track R2b.

Setting of Multiple Circular Arc Path

Figure 13:
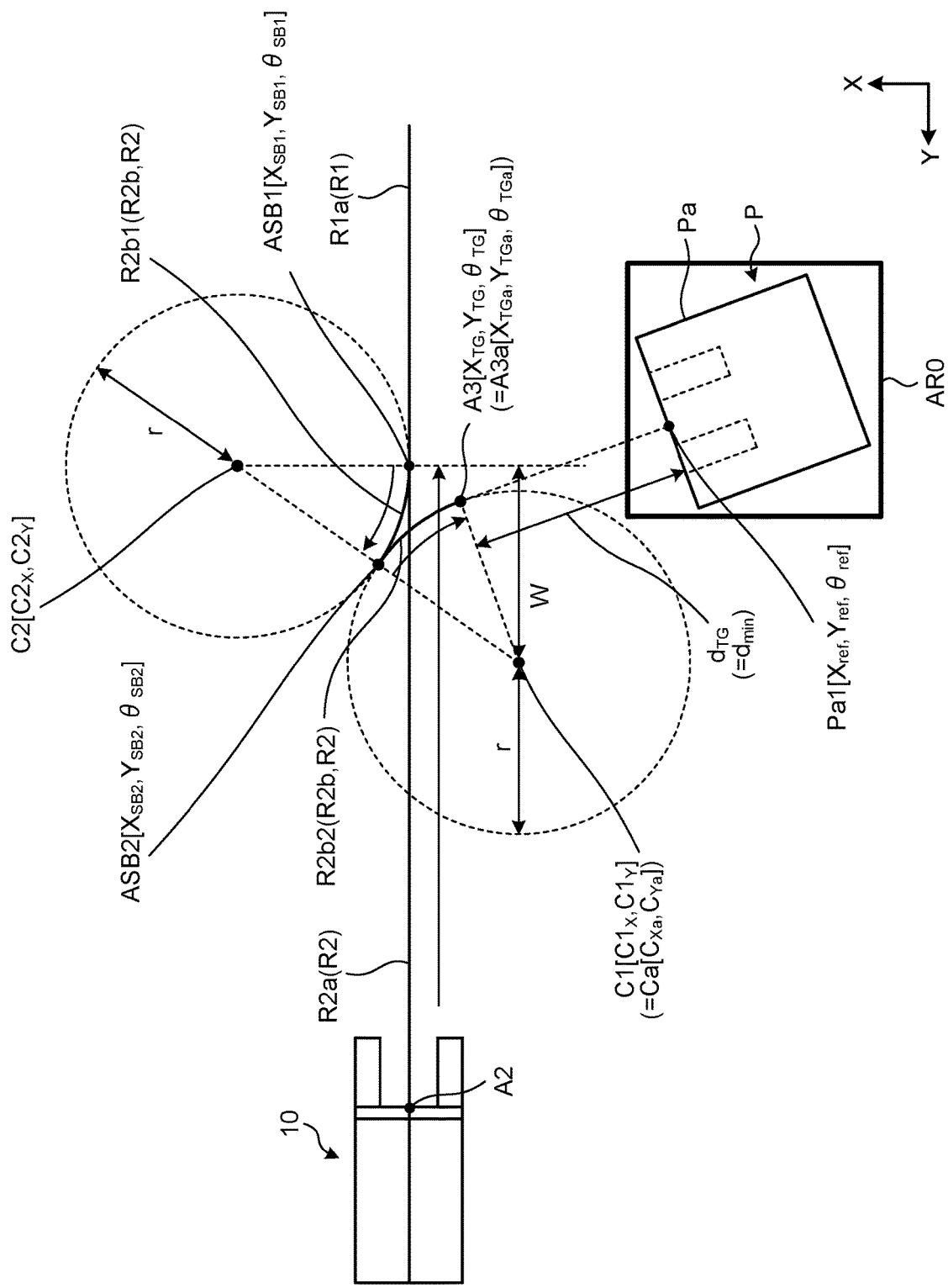
FIG. 13 is a schematic diagram for explaining a case of setting a multiple circular arc path as the second path.

On the other hand, as illustrated in FIG. 11, if it is determined that the track toward the opposite side of the target position A3 is required (Yes at Step S34), the second path information acquisition unit 76 sets a multiple circular arc path including a plurality of (in this example, two) circular arc tracks R2b as the second path R2. FIG. 13 is a schematic diagram for explaining a case of setting a multiple circular arc path as the second path. In this case, the second path information acquisition unit 76 calculates coordinates of a center C2 of the circular arc track based on the turning radius r and the position and attitude information on the target object P (Step S44). The center C2 of the circular arc track indicates a center of a locus of a circular arc track R2b1 toward the opposite side of the target position A3. More specifically, as illustrated in FIG. 13, the second path information acquisition unit 76 treats the center Ca of the temporary circular arc track as the center C1 of the circular arc track, and sets coordinates $C1_X$ and $C1_Y$ of the center C1 of the circular arc track as $C_{Xa}$ and $C_{Ya}$. The second path information acquisition unit 76 then calculates the coordinates of the center C2 of the circular arc track so that a circle centered on the center C2 of the circular arc track and having the turning radius r is brought into contact with a circle centered on the center C1 of the circular arc track and having the turning radius r at one point. Specifically, assuming that the coordinates in the direction X and the direction Y of the center C2 of the circular arc track are respectively $C2_X$ and $C2_Y$, the second path information acquisition unit 76 calculates a distance w along the direction X between the center C1 of the circular arc track and the center C2 of the circular arc track to be calculated, by using the following Equation (12).

$$w = \sqrt{(2r)^2 - (r + X_{SB1} - Cx)^2} \quad (12)$$

The second path information acquisition unit 76 then calculates the coordinates $C2_X$ and $C2_Y$ of the center C2 of the circular arc track based on the following Equations (13) and (14).

$$C2_X = X_{SB1} + r \quad (13)$$

$$C2_Y = C1_Y - w \quad (14)$$

Next, as illustrated in FIG. 11, the second path information acquisition unit 76 calculates the position and the attitude at the intermediate position ASB1 (Step S46). As illustrated in FIG. 13, the intermediate position ASB1 on the multiple circular arc path is a position at which the linear track R2a is switched to the circular arc track R2b1 centered on the center C2 of the circular arc track. The coordinate $X_{SB1}$ in the X-direction and the attitude $\theta S_{B1}$ at the intermediate position ASB1 are known, so that the second path information acquisition unit 76 calculates the coordinate $Y_{SB1}$ in the direction Y of the intermediate position ASB1. The second path information acquisition unit 76 calculates the coordinate $Y_{SB1}$ of the intermediate position ASB1 based on the coordinates of the center C2 of the circular arc track. Specifically, as represented by the following Equation (15), the second path information acquisition unit 76 calculates the coordinate $C2_Y$ of the center C2 of the circular arc track and the coordinate $Y_{SB1}$ of the intermediate position ASB1.

$$Y_{SB1} = C2_Y \quad (15)$$

Next, as illustrated in FIG. 11, the second path information acquisition unit 76 calculates the position and the attitude at the intermediate position ASB2 (Step S48). As illustrated in FIG. 13, an intermediate position ASB2 on the multiple circular arc path is a position at which the circular arc track R2b1 centered on the center C2 of the circular arc track is switched to a circular arc track R2b2 centered on the center C1 of the circular arc track. The intermediate position ASB2 is positioned on the opposite side of the disposition region AR0 (that is, the X-direction side) with respect to the detection track R1a. The second path information acquisition unit 76 calculates the position and the attitude at the intermediate position ASB2 based on the coordinates of the center C1 of the circular arc track and the coordinates of the center C2 of the circular arc track. Assuming that the coordinates in the direction X and the direction Y of the intermediate position ASB2 are respectively $X_{SB2}$ and $Y_{SB2}$, and the attitude (rotation angle) of the mobile object 10 at the intermediate position ASB2 is $\theta_{SB2}$, the second path information acquisition unit 76 calculates the position and the attitude at the intermediate position ASB2 by using the following Equations (16) to (18).

$$X_{SB2} = (C1_X + C2_X)/2 \quad (16)$$

$$Y_{SB2} = (C1_Y + C2_Y)/2 \quad (17)$$

$$\theta_{SB2} = \tan^{-1}\{(C2_X - C1_X)/(C2_Y - C1_Y)\} + \pi/2 \quad (18)$$

As illustrated in FIG. 11, the second path information acquisition unit 76 then calculates the position and the attitude at the target position A3 based on the coordinates of the temporary target position A3a and the position and attitude information on the target object P (Step S50). The second path information acquisition unit 76 calculates [$X_{TG}$, $Y_{TG}$, $\theta_{TG}$] as the position and the attitude at the target position A3 by using the following Equations (19) to (21).

$$X_{TG} = X_{TGa} \quad (19)$$

$$Y_{TG} = Y_{TGa} \quad (20)$$

$$\theta_{TG} = \theta_{ref} \quad (21)$$

That is, the second path information acquisition unit 76 sets the temporary target position A3a as the target position A3.

As illustrated in FIG. 11, the second path information acquisition unit 76 then calculates the second path R2 based on positions and attitudes at the intermediate positions ASB1 and ASB2, and the position and the attitude at the target position A3 (Step S42). As illustrated in FIG. 13, the second path information acquisition unit 76 sets the linear track R2a from the second position A2 to the intermediate position ASB1 based on the coordinates of the second position A2 and the coordinates of the intermediate position ASB1, sets the circular arc track R2b1 from the intermediate position ASB1 to the intermediate position ASB2 based on the position and the attitude at the intermediate position ASB1, the position and the attitude at the intermediate position ASB2, and the turning radius r, and sets the circular arc track R2b2 from the intermediate position ASB2 to the target position A3 based on the position and the attitude at the intermediate position ASB2, the position and the attitude at the target position A3, and the turning radius r. In this way, the second path R2 as the multiple circular arc path is constituted of the linear track R2a, the circular arc track R2b1 (first circular arc track) that is connected to the linear track R2a and runs toward the opposite side of the disposition region AR0 side (that is, the X-direction side), and the circular arc track R2b2 (second circular arc track) that is connected to the circular arc track R2b1 and runs toward the disposition region AR0 side (that is, the opposite side of the X-direction).

The method described above is a setting method in a case in which the second path R2 is the multiple circular arc path including the track bulging toward the X-direction side (circular arc track R2b1). In a case of using the multiple circular arc path as the second path R2, the mobile object 10 moves from the second position A2 to the intermediate position ASB1 along the linear track R2a, switches the linear track R2a to the circular arc track R2b1, that is, turns back at the intermediate position ASB1, and moves to the intermediate position ASB2 along the circular arc track R2b1. At the intermediate position ASB2, the mobile object 10 switches the circular arc track R2b1 to the circular arc track R2b2, that is, changes the traveling direction to move toward the target position A3 along the circular arc track R2b2.

As described above, in this example, it is determined whether the track bulging toward the X-direction side is required. If this track is not required, the single circular arc path without the track bulging toward the X-direction side is set, and if the track is required, the multiple circular arc path is set. Thus, according to this example, it is possible to set the appropriate second path R2 for enabling turning back toward the X-direction side, for example, in accordance with the position and the attitude of the target object P. Furthermore, by setting the second path R2 by combining only the linear track R2a and the circular arc track R2b, the second path R2 can be generated at high speed while a calculation load is suppressed. The turning radius r of the circular arc track R2b corresponds to a rudder angle command of the mobile object 10 on a one-to-one basis, so that it is possible to simultaneously obtain the rudder angle command of the mobile object 10 that can move on the circular arc track R2b in a case in which there is no disturbance. In a case in which a rudder angle is fixed, the turning radius r does not depend on a moving speed, so that an optional moving speed may be set in a range in which a slip and the like are not caused.

To make an appropriate approach to the target object P, it may be efficient that the route may be set such that the mobile object 10 temporarily moves away from the target object P, and turns back. However, the third path R3 is set by optimization calculation, so that the route cannot be set such that the mobile object 10 temporarily moves away from the target object P and turns back. On the other hand, by providing the second path R2 before the third path R3, an efficient route including turning back can be set.

Second Embodiment

Next, the following describes the second embodiment. The second embodiment describes a specific example of a method of switching the second path R2 to the third path R3. In the second embodiment, the same configurations as those in the first embodiment will not be described again. The second embodiment can also be applied to the first embodiment and another example of the first embodiment.

In the second embodiment, the third path information acquisition unit 78 determines whether to switch the second path R2 to the third path R3 based on at least one of detection accuracy for the target object P detected by the sensor 26, the traveling direction of the mobile object 10, and the distance between the mobile object 10 and the target object P during a period in which the mobile object 10 moves along the second path R2. Specific description will be made hereinafter.

Figure 14:
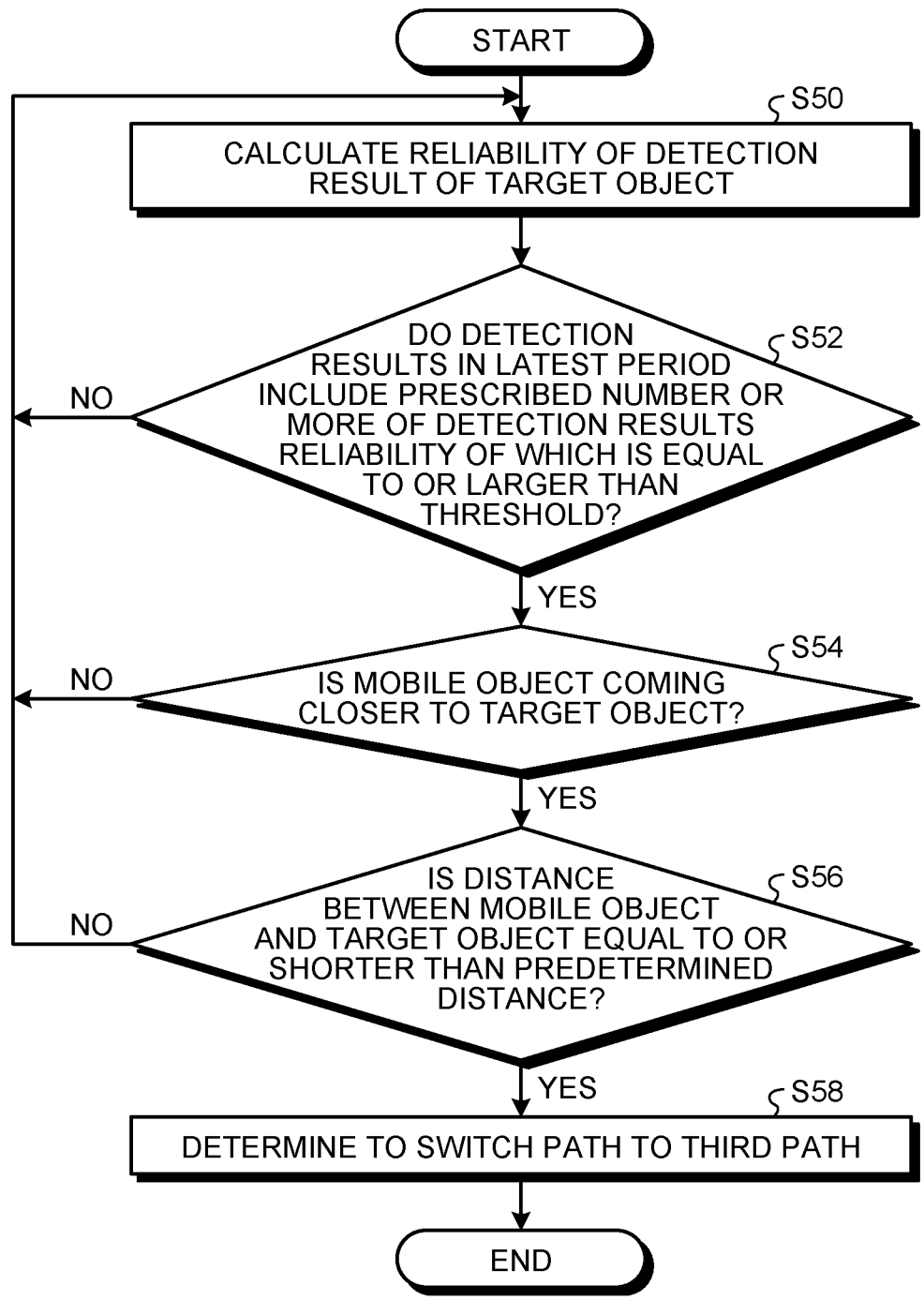
FIG. 14 is a flowchart for explaining a procedure of determining switching from the second path to the third path.

FIG. 14 is a flowchart for explaining a procedure of determining switching from the second path to the third path. The detection control unit 74 causes the sensor 26 to successively detect the target object P while the mobile object 10 is moving along the second path R2. As illustrated in FIG. 14, the detection control unit 74 calculates reliability of the detection result of the target object P obtained by the sensor 26 (Step S50). The reliability is an indicator indicating whether the target object P is appropriately detected, in other words, reliability of the detection accuracy. The detection control unit 74 calculates the reliability per detection process (one scanning process) performed by the sensor 26. That is, the detection control unit 74 assigns the same reliability to detection results (point group) acquired by the same detection process (same scanning process) performed by the sensor 26.

The detection control unit 74 may calculate the reliability of the detection result of the target object P by an optional method. The following describes an example of a calculation method for the reliability. For example, based on a ratio of the number of actual measuring points acquired by one detection process performed by the sensor 26 to the number of ideal measuring points that should be acquired by one detection process performed by the sensor 26, the detection control unit 74 calculates the reliability of the detection result obtained by this detection process. The number of ideal measuring points may be calculated by an optional method. For example, the number of ideal measuring points may be calculated based on a positional relation between the mobile object 10 at the time of detection and a straight line calculated by the detection control unit 74 based on the point group (a straight line corresponding to the front surface Pa of the target object P). That is, by treating the straight line as the front surface Pa of the target object P, the number of measuring points M assumed to be observed at the front surface Pa of the target object P can be calculated based on the position of the mobile object 10 at the time of detection, the position of the front surface Pa (straight line) of the target object P, and performance of the sensor 26 (for example, angle resolution). In this example, the detection control unit 74 calculates the number of measuring points M assumed to be observed at the front surface Pa of the target object P as the number of ideal measuring points M based on the position of the mobile object 10 at the time of detection, the position of the front surface Pa (straight line), of the target object P, and the angle resolution of the sensor 26. The angular resolution indicates an angle at which two separate subject points can be detected.

The detection control unit 74 then calculates, as the reliability of the detection result obtained by the detection process, a ratio of a total value of the number of the actual measuring points to a total value of the number of the ideal measuring points. Measuring points at positions remote from the front surface Pa may be excluded, and the number of the remaining measuring points may be assumed to be the number of the actual measuring points.

As described above, while the mobile object 10 is moving along the second path R2, the detection control unit 74 calculates the reliability of the detection result of the target object P while causing the sensor 26 to successively detect the target object P. The third path information acquisition unit 78 then determines whether the reliability of the detection result of the target object P is equal to or larger than a predetermined value. More specifically, the third path information acquisition unit 78 extracts a predetermined number of detection results of the target object P detected in the latest period, and determines whether the predetermined number of extracted detection results in the latest period include a prescribed number or more of detection results the reliability of which is equal to or larger than a threshold (Step S52). The predetermined number, the threshold, and the prescribed number may be optionally set herein. For example, assuming that the predetermined number is 10 times, the threshold is 70%, and the prescribed number is 9 (90%), the third path information acquisition unit 78 determines that the number of detection results the reliability of which is equal to or larger than the threshold is equal to or larger than the prescribed number in a case in which 10 detection results in the latest period include 9 detection results the reliability of which is equal to or larger than 70%.

If the number of detection results the reliability of which is equal to or larger than the threshold is not equal to or larger than the prescribed number (No at Step S52), the process returns to Step S50 without switching the path to the third path R3, and movement along the second path R2 and detection of the target object P are continued. It can be said that the processing at Step S52 is an example of processing of determining whether the mobile object 10 arrives at the detection enabled position A4. By determining whether the number of detection results the reliability of which is equal to or larger than the threshold is equal to or larger than the prescribed number like Step S52, it is possible to appropriately determine whether the mobile object 10 arrives at the position at which the sensor 26 can continuously and appropriately detect the target object P. That is, in a case in which the number of detection results the reliability of which is equal to or larger than the threshold is not equal to or larger than the prescribed number, the target object P cannot be continuously and appropriately detected, so that the third path R3 that is successively updated cannot be appropriately set in some cases. In such a case, a setting fault of the third path R3 can be prevented by not switching the path to the third path R3.

On the other hand, if the number of detection results the reliability of which is equal to or larger than the threshold is equal to or larger than the prescribed number (Yes at Step S52), the third path information acquisition unit 78 determines whether the mobile object 10 is coming closer to the target object P (Step S54). That is, the third path information acquisition unit 78 determines whether the mobile object 10 is moving along a turning back route (for example, the circular arc track R2b1) moving away from the target object P. For example, based on a current traveling direction of the mobile object 10, the third path information acquisition unit 78 determines whether the mobile object 10 is moving assuming that the rear direction in which the fork 24 is not disposed is the forward side of the traveling direction. The third path information acquisition unit 78 determines that the mobile object 10 is not coming closer to the target object P (that is, moving along the turning back route) in a case in which the mobile object 10 is moving assuming that the rear direction is the forward side of the traveling direction, and determines that the mobile object 10 is coming closer to the target object P (that is, not moving along the turning back route) in a case in which the mobile object 10 is moving assuming that the front direction on the fork 24 side is the forward side of the traveling direction.

If the third path information acquisition unit 78 determines that the mobile object 10 is not coming closer to the target object P (No at Step S54), the process returns to Step S50 without switching the path to the third path R3, and movement along the second path R2 and detection of the target object P are continued. On the other hand, if it is determined that the mobile object 10 is coming closer to the target object P (Yes at Step S54), the third path information acquisition unit 78 determines whether the distance between the mobile object 10 and the target object P is equal to or smaller than a predetermined distance (Step S56). If the distance between the mobile object 10 and the target object P is equal to or smaller than the predetermined distance (Yes at Step S56), the third path information acquisition unit 78 determines to switch the path to the third path R3 (Step S58), sets the third path R3, and switches the route to the third path R3. On the other hand, if the distance between the mobile object 10 and the target object P is not equal to or smaller than the predetermined distance (No at Step S56), the process returns to Step S50 without switching the path to the third path R3, and movement along the second path R2 and detection of the target object P are continued. In this way, in a case in which the mobile object 10 is moving along the turning back route and not coming closer to the target object P, the mobile object 10 does not face the target object P yet, so that there is the possibility that the target object P cannot be continuously and appropriately detected. Thus, by determining whether to switch the path to the third path R3 according to the determination criterion as described above, it is possible to prevent a situation in which the target object P cannot be continuously and appropriately detected, and prevent a setting fault of the third path R3.

Third Embodiment

Next, the following describes a third embodiment. The third embodiment describes a specific example of a setting method for the third path R3. In the third embodiment, the same configurations as those in the first embodiment will not be described again. The third embodiment can also be applied to the first embodiment, another example of the first embodiment, and the second embodiment.

Figure 15:
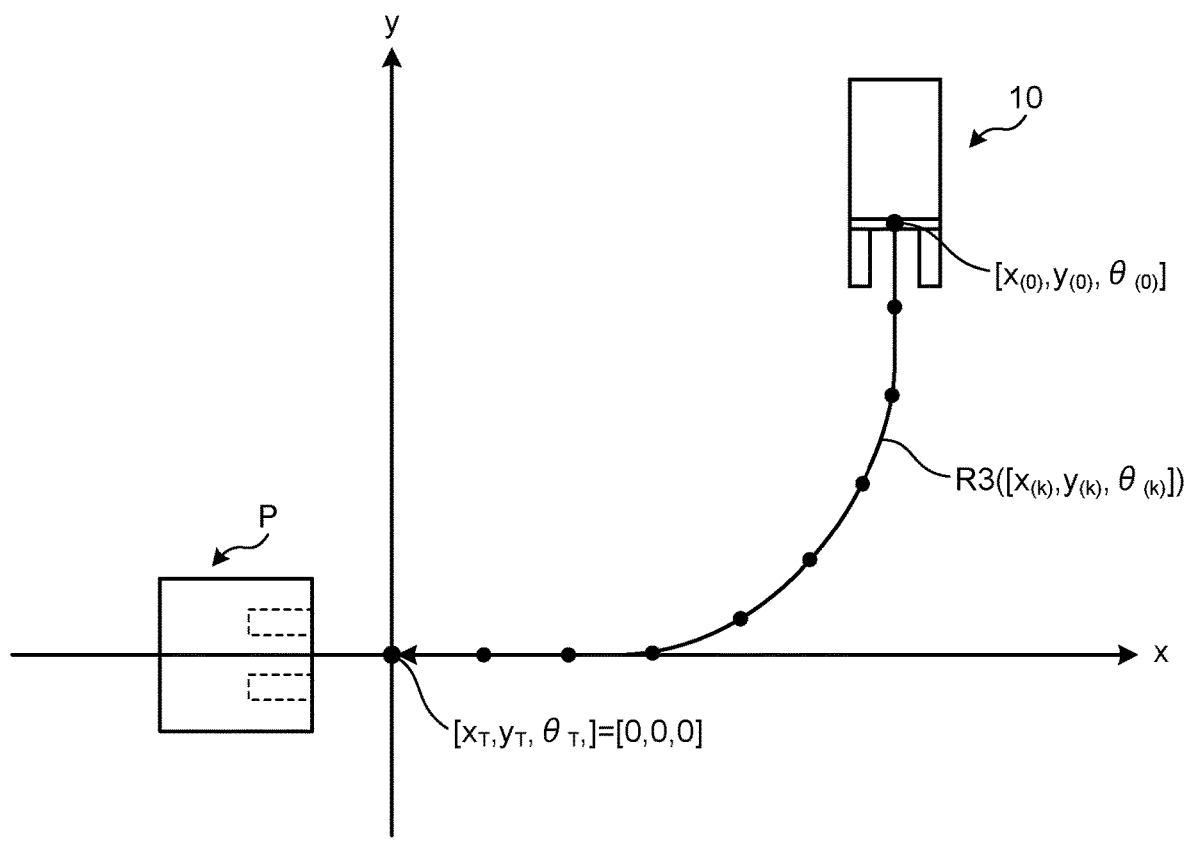
FIG. 15 is a schematic diagram for explaining the third path.

FIG. 15 is a schematic diagram for explaining the third path. The third path information acquisition unit 78 executes optimization calculation, calculates the optimized third path R3 of the mobile object 10, and calculates a driving condition for the mobile object 10 that can implement the calculated third path R3. The driving condition indicates an input value for operating a power unit of the mobile object 10, that is, indicates a speed and a steering angle of the mobile object 10 herein. In the present embodiment, the third path information acquisition unit 78 sets the third path R3 by setting the position and the attitude of the mobile object 10 for each read-ahead step. The read-ahead step means each discrete time after the present time (a timing at which the position and the attitude of the mobile object 10 or the target object P are detected in the latest period). The third path information acquisition unit 78 executes optimization calculation based on an evaluation function with which an evaluation becomes higher as a deviation between the position of the mobile object 10 and the target object P at each read-ahead step becomes smaller, calculates the third path R3 optimized by the optimization calculation, and calculates the driving condition for the mobile object that can implement the third path R3. The following specifically describes optimization calculation executed by a calculation execution unit 56. While the following describes an example of motion of the mobile object 10 on the two-dimensional coordinate plane, the example can also be applied to a motion model on three-dimensional coordinates.

Position of mobile object at each read-ahead step Herein, it can be said that the optimized third path R3 calculated by the third path information acquisition unit 78 is a set of the position and the attitude of the mobile object 10 at each read-ahead step (at each discrete time after the present time), and is also a future route. As illustrated in FIG. 15, the third path information acquisition unit 78 coordinate-converts the detected position and attitude of the mobile object 10 into the position and the attitude in the coordinate system of the target object P (the two-dimensional coordinate system in the x-direction and the y-direction). That is, while a self position and attitude (the position and the attitude of the mobile object 10) and a target position and attitude (the position and the attitude of the target object P) are used as inputs herein, the self position and attitude are coordinate-converted to be treated based on the target position and attitude at the time of generating the route in accordance with an optimization problem, so that the coordinate system of the route that is made using the self position and attitude as a starting point is based on the target position and attitude. This procedure can be applied to both of a case in which the self position and attitude and the target position and attitude are obtained in the coordinate system on the two-dimensional surface along the direction X and the direction Y (the local coordinate system based on the region AR or the global coordinate system) and a case in which a local target position and attitude are obtained based on a sensor coordinate system of the mobile object 10.

Herein, assuming that the position (coordinates) in the x-direction and the y-direction of the mobile object 10 is $[x, y]^T$, the attitude of the mobile object 10 is $\theta$, and the read-ahead step (discrete time) is k, the position and the attitude of the mobile object 10 at the read-ahead step k, that is, the third path R3 at the read-ahead step k is represented by the following Equation (22). Herein, T indicates transposition. As described above, the present embodiment describes the example of motion on the two-dimensional plane coordinates. For example, in a case of using a motion model on three-dimensional coordinates, the following Equations and the like are adjusted to the three-dimensional coordinates.

$$p(k)=[x(k)y(k)\theta(k)]^T \tag{22}$$

In this case, the motion model of the mobile object 10 is represented by the following Equation (23).

$$p(k+1)=f(p(k),u(k),\Delta t) \tag{23}$$

In Equation (23), $\Delta t$ represents a time width related to transition from (k) to (k+1). $\Delta t$ may be the same as an updating cycle of the third path R3 (a time width from when the third path R3 is updated until the third path R3 is updated again). Alternatively, for example, $\Delta t$ may be shorter than the updating cycle, or may be longer than the updating cycle. The specific third path R3 can be generated by causing $\Delta t$ to be shorter than the updating cycle, and a calculation load can be reduced by causing $\Delta t$ to be longer than the updating cycle. u(k) represents an input for a system, and indicates the driving condition for the mobile object 10. In the example of the present embodiment, u(k) is represented by the following Equation (24) by using a speed v(k) of the mobile object 10 and a curvature c(k) of the mobile object 10.

$$u(k)=[v(k)c(k)]^T \tag{24}$$

The curvature indicates, assuming that the mobile object 10 has moved at a current steering angle, an inverse number of a radius of a circle (radius of curvature) depicted by the mobile object 10. For example, the curvature c(k) at the read-ahead step k is defined by the following Equation (25). $\Phi(k)$ indicates the steering angle of the mobile object 10 at the read-ahead step k, and L indicates a wheel base, for example, a distance between a front wheel and a rear wheel.

$$c(k)=\frac{1}{L}\cdot\tan\phi(k) \tag{25}$$

In a case of assuming motion on the two-dimensional plane coordinates, f as an equation of state of the system is represented by the following Equation (26), by way of example.

$$f(p(k),u(k),\Delta t)=\begin{bmatrix}x(k)+\Delta t\cdot v(k)\cdot\cos\theta(k)\\ y(k)+\Delta t\cdot v(k)\cdot\sin\theta(k)\\ \theta(k)+\Delta t\cdot v(k)\cdot c(k)\end{bmatrix} \tag{26}$$

The third path information acquisition unit 78 performs estimation (a read ahead) of a moving route by using a concept of model estimation control, evaluates a deviation between the mobile object 10 and the target position related to positions at respective estimation steps of the mobile object 10 by using the evaluation function with which the evaluation becomes higher as the deviation from the target position becomes smaller in the relation between the mobile object 10 and the target object P at each read-ahead step, and specifies the third path R3. Accordingly, the third path information acquisition unit 78 can specify the optimum third path R3, that is, an optimum position and attitude of the mobile object 10 for each read-ahead step. In other words, the third path information acquisition unit 78 specifies the optimum position and attitude of the mobile object 10 (that is, the optimum third path R3) for each read-ahead step with which the deviation between the position of the mobile object 10 and the position of the target object P at each read-ahead step becomes the smallest.

In the present embodiment, a problem V(u, p, k) for optimizing the third path R3 is assumed to be represented by the following Equation (27).

$$V(u,p,k)=\min_u\sum_k J(u,p,k) \tag{27}$$

Herein, J(u, p, k) is an evaluation function representing an object of optimization, and set to be a function including approach to or arrival at the target position in a case of a route plan. In the example of the present embodiment, the third path information acquisition unit 78 sets the evaluation function J(u, p, k) as represented by the following Equation (28).

$$J(u,p,k)=A_1(x(k)-x_T)^2+A_2(y(k)-y_T)^2 \tag{28}$$

Herein, $p_T=[x(k), y(k)]^T$, that is, $x_T$ and $y_T$ in Equation (28) are an objective position (the position of the target object P). Under this evaluation function, optimization is performed so that a deviation between the position (p(k)) of the mobile object 10 at each read-ahead step k and the position ($p_T$) of the target object P becomes small. That is, an optimization result is such that the mobile object 10 comes closer to the objective position with the shortest distance.

$A_1$ and $A_2$ are weighting factors that minimize errors in the x-coordinate and the y-coordinate, and may be optionally set. For example, in a case of attaching importance to causing the mobile object 10 to face the target object P (target position and attitude), a weight of the y-coordinate is caused to be larger than a weight of the x-coordinate by causing $A_2$ to be larger than $A_1$. That is, priority is given to causing the deviation between the target object P and the mobile object 10 to be smaller on the y-coordinate over causing the deviation between the target object P and the mobile object 10 to be smaller on the x-coordinate. Due to this, the third path R3 is generated to run along the x-axis, and as a result, the mobile object 10 can be caused to face the target position and attitude at an early stage.

In the present embodiment, the evaluation function does not include the attitude (θ), and calculation for minimizing the deviation between the attitudes of the mobile object 10 and the target object P is not included. In this way, as the evaluation function does not include the attitude, the optimization problem can be simplified, and the calculation load can be reduced. Even if the evaluation function does not include the attitude, the deviation between the attitudes becomes smaller as the deviation between the positions of the mobile object 10 and the target object P becomes smaller.

By executing optimization calculation as described above, the third path information acquisition unit 78 sets the optimized third path R3, and obtains a value of u(k) as the driving condition (input for the system) for each read-ahead step as an output (optimal solution) of the optimization calculation. It can be said that the driving condition for each read-ahead step obtained by the third path information acquisition unit 78 is a driving condition for implementing the optimized third path R3. The third path information acquisition unit 78 uses a solution of the optimization problem for direct vehicle control, so that the third path information acquisition unit 78 uses, for control, u(1)=(v(1) c(1)) as a value of a first time (k=1) among optimal solutions that have been successively obtained. In this case, the curvature c is not suitable for being directly used for direct vehicle control, so that the curvature c is preferably converted into the steering angle Φ to be used by using the relation of Equation (27). As in the present embodiment, by using the curvature c without causing the optimization calculation to openly include the steering angle Φ, a non-linear characteristic (a trigonometric function) can be relaxed, and calculation accuracy for the optimization calculation and a convergence speed can be improved. However, the embodiment is not limited thereto. The steering angle Φ may be used in place of the curvature c in the optimization calculation.

In the third embodiment, as described above, an optimum route is read ahead under the predetermined function while a control input corresponding thereto is generated at the same time, so that it is possible to set a smooth behavior and locus of the vehicle having less variation than that in control for simply following a certain route. The positions and the attitudes of the mobile object 10 and the target object P are successively detected to update the third path R3, so that feedback control is implemented, and the vehicle can be controlled while errors caused by a modeling error and the like are absorbed.

Fourth Embodiment

Next, the following describes a fourth embodiment. The fourth embodiment describes a specific example of a setting method for the fourth path R4. In the fourth embodiment, the same configurations as those in the first embodiment will not be described again. The fourth embodiment can also be applied to the first embodiment, another example of the first embodiment, the second embodiment, and the third embodiment.

Herein, the mobile object 10 is nonholonomic, and the position and the attitude thereof are linked together such that horizontal movement cannot be performed, for example. Thus, when the mobile object 10 is steered to adjust only the position to match a target value (front of the target object P), the attitude does not match the target value, and a problem may be caused such that the fork 24 of the mobile object 10 cannot be inserted into the opening Pb of the target object P, for example. On the other hand, in the present embodiment, by using the third path R3 that is set by performing a read ahead of the self position and attitude by using model estimation control, both of the position and the attitude can be caused to converge to the target values. On the other hand, the fourth path R4 set by the fourth path information acquisition unit 80 is set by using a technique related to a servo for outputting a steering command value by feedback of the deviation between the position and the attitude of the target object P detected by the sensor 26 and the self position and attitude. In the fourth path R4, high-speed and stable processing is implemented by not performing a read ahead or optimization as in the third path R3, and the mobile object 10 can robustly approach the target object P against variation in the position and the attitude of the target object P. The following specifically describes switching from the third path R3 to the fourth path R4, and a setting method for the fourth path R4.

Switching to Fourth Path

The fourth path information acquisition unit 80 determines to switch the third path R3 to the fourth path R4 when the mobile object 10 arrives at the switching position A5. More specifically, the switching position A5 is a position at which the mobile object 10 can be caused to arrive at the target object P while satisfying a condition imposed on the position and the attitude of the mobile object 10 at the time of arriving at the target object P in accordance with the position and the attitude of the target object P, under restrictions on movement and steering of the mobile object 10. Herein, the condition means that alignment between a reference position of the target object P and a reference position of the mobile object 10 is achieved, for example. Herein, the restrictions mean that the mobile object 10 is nonholonomic as described above, and are a range of the speed (from an upper limit to a lower limit) and a range of the steering angle (from an upper limit to a lower limit), which are set in advance.

For example, the fourth path information acquisition unit 80 performs processing of obtaining the target position (q=[$x_{PP}$ $y_{PP}$ $θ_{PP}$]) at which the mobile object 10 faces the target object P. The target position (q) is derived based on the following Equation (29).

$$q = p + \begin{bmatrix} D \cos θ_T \\ D \sin θ_T \\ 0 \end{bmatrix} \quad (29)$$

In Equation (29), p represents the position and the attitude of the target object P. In Equation (29), D represents a design parameter representing a distance between a target position, that is, the target position (q) and the position and orientation of the target object P, which is determined in advance. The third path R3 is successively updated, so that the fourth path information acquisition unit 80 updates p and the target position (q) at cycles determined in advance, for example. As the mobile object 10 comes closer to the target position (q), a value of q is changed to converge to 0.

The fourth path information acquisition unit 80 determines that the mobile object 10 arrives at the switching position A5 in a case in which the value of q becomes equal to or smaller than a threshold determined in advance, and determines to switch the third path R3 to the fourth path R4. The switching position A5 becomes a position facing the orientation of the target object P, for example. The switching position A5 may be a region having a predetermined space.

Setting of Fourth Path

FIG. 16 is a flowchart for explaining setting of the fourth path. The fourth path information acquisition unit 80 sets the fourth path R4 when the mobile object 10 arrives at the switching position A5. As illustrated in FIG. 16, when the mobile object 10 arrives at the switching position A5, the fourth path information acquisition unit 80 acquires the detection result of the position and the attitude of the target object P obtained by the sensor 26, and the detection result of the position and the attitude of the mobile object 10 (Step S60). The fourth path information acquisition unit 80 then determines whether the mobile object 10 can arrive at the target object P without switching between positive and negative of the steering angle of the mobile object 10 based on the positions and the attitudes of the target object P and the mobile object 10, and the restrictions on movement and steering of the mobile object 10 (Step S62). Switching between positive and negative of the steering angle means changing the steering angle in one direction, and changing the steering angle in the other direction thereafter. That is, the fourth path information acquisition unit 80 determines whether the mobile object 10 can arrive at the target object P by changing the steering angle only in one direction. If it is determined that the mobile object 10 can arrive at the target object P without switching positive and negative of the steering angle (Yes at Step S62), the fourth path information acquisition unit 80 determines whether a deviation between the relative positions of the mobile object 10 and the target object P falls within a permissible range (Step S64). If the deviation falls within the permissible range (Yes at Step S64), the fourth path information acquisition unit 80 performs feedback control based on relative attitudes of the mobile object 10 and the target object P, and sets the fourth path R4. That is, the fourth path information acquisition unit 80 determines that the mobile object 10 sufficiently comes closer to a position facing the target object P, and performs feedback control to match the relative attitudes to each other. In this case, for example, the fourth path information acquisition unit 80 may perform feedback control so that a deviation between the relative attitudes of the mobile object 10 and the target object P becomes small based on the following Equation (30), and set the fourth path R4.

$$\Phi(k)=G\{\theta_{ref}-\theta(k)\} \quad (30)$$

$\theta_{ref}$ is the attitude of the target object P, and G is the evaluation function. Additionally, in this case, the speed v(k) may be fixed.

On the other hand, in a case in which it is determined that the mobile object 10 cannot arrive at the target object P unless switching between positive and negative of the steering angle of the mobile object 10 (No at Step S62), and in a case in which the deviation between the relative positions of the mobile object 10 and the target object P does not fall within the permissible range (No at Step S64), the fourth path information acquisition unit 80 performs feedback control based on the relative positions of the mobile object 10 and the target object P, and sets the fourth path R4 (Step S68). That is, the fourth path information acquisition unit 80 determines that the mobile object 10 does not sufficiently come closer to the position facing the target object P, and performs feedback control to match the relative positions to each other. For example, the fourth path information acquisition unit 80 may perform feedback control so that the deviation between the relative positions of the mobile object 10 and the target object P becomes small based on the following Equation (31), and set the fourth path R4.

$$\Phi(k)=G\{y_{ref}-y(k)\} \quad (31)$$

$y_{ref}$ is the position of the target object P, and G is the evaluation function. Additionally, in this case, the speed v(k) may be fixed.

After Step S66 and Step S68 are performed, in a case of not ending the processing (No at Step S70), the process returns to Step S60 and the fourth path R4 is updated. In a case of ending the processing (Yes at Step S70), this processing is ended. For example, it may be determined that the processing is ended in a case in which the relative positions and the relative attitudes of the mobile object 10 and the target object P fall within the permissible range.

As described above, the fourth path R4 is a route the driving condition for which is set based on only a deviation between instantaneous values without executing optimization calculation such as model estimation control. Thus, a processing time is shorter as compared with an approach for optimization, and fine adjustments can be made immediately before arrival at the target object P. Additionally, calculation results do not diverge, so that a stable operation is enabled.

Effects of Present Disclosure

As described above, the control method according to the present disclosure is a control method for the mobile object 10 that automatically moves, and includes: a step of causing the mobile object 10 to move along the first path R1; a step of causing the sensor 26 mounted on the mobile object 10 to detect the position and the attitude of the target object P while the mobile object 10 is moving along the first path R1; a step of setting the second path R2 to the target position A3 at which the predetermined position and attitude with respect to the target object P are achieved based on the position and the attitude of the target object P; a step of switching the first path R1 to the second path R2 to cause the mobile object 10 to move along the second path R2; a step of executing optimization calculation based on the evaluation function with which the evaluation becomes higher as the deviation between the position of the target object P and the position of the mobile object 10 becomes smaller, and setting the third path R3; and a step of switching the second path R2 to the third path R3 to cause the mobile object 10 to move along the third path R3.

According to the present control method, the mobile object 10 can appropriately approach the target object P (target position) by approaching the target object P while switching the moving route among the first path R1, the second path R2, and the third path R3. More specifically, by using the second path R2 that is set based on the position and attitude information on the target object P, which is detected during movement along the first path R1, the mobile object 10 can appropriately approach the target object P in accordance with the actual position and attitude of the target object P even if the position of the target object P is deviated from the disposition region AR0, for example. Furthermore, even in a case in which the mobile object 10 deviates from the second path R2 due to influence of disturbance and the like, or a case in which there is an error in the detection result obtained by the sensor 26 that is used for setting the second path R2, the mobile object 10 can appropriately approach the target object P by switching the path to the third path R3 using optimization calculation.

The first path R1 is a route traversing the disposition region AR0 in a second direction (Y-direction) intersecting with a first direction on the first direction (X-direction) side with respect to the disposition region AR0 in which the target object P is disposed. At the step of causing the mobile object 10 to move along the first path R1, the mobile object 10 is caused to move along the first path R1 from the first position A1 on one side with respect to the disposition region AR0 in the second direction to the second position A2 on the other side with respect to the disposition region AR0 in the second direction. At the step of causing the position and the attitude of the target object P to be detected, the sensor 26 is caused to detect the position and the attitude of the target object P while the mobile object 10 is moving from the first position A1 to the second position A2. According to the present method, detection is caused to be performed while the mobile object 10 is moving from the first position A1 to the second position A2, so that detection accuracy can be prevented from being lowered, and the second path R2 can be appropriately set.

At the step of setting the second path R2, the second path R2 is set to include the linear track R2a overlapping the track from the first position A1 to the second position A2 of the first path R1, and the circular arc track R2b connected to the linear track R2a. In this way, by generating the track with a straight line and a circular arc, the track can be geometrically calculated, and a calculation load can be reduced.

At the step of setting the second path R2, the second path R2 is set to include, as the circular arc track R2b, the first circular arc track (circular arc track R2b1) running toward the opposite side of the disposition region AR0 in the first direction, and the second circular arc track (circular arc track R2b2) connected to the first circular arc track and running toward the disposition region AR0 side in the first direction. In this way, by causing the second path R2 to include the turning back track, an efficient route can be set in a case in which a turning back route is efficient.

The present control method further includes a step of determining whether to switch the second path R2 to the third path R3 based on at least one of detection accuracy for the target object P detected by the sensor 26 while the mobile object 10 is moving along the second path R2, the traveling direction of the mobile object 10, and the distance between the mobile object 10 and the target object P. In this way, by determining whether to switch the path to the third path R3, it is possible to prevent the detection accuracy for the target object P from being lowered at the time of setting the third path R3, and appropriately set the third path R3.

At the step of determining whether to switch the second path R2 to the third path R3, it is determined to switch the second path R2 to the third path R3 in a case in which reliability of the detection accuracy for the target object P is equal to or larger than the predetermined value, the mobile object 10 is traveling in a direction coming closer to the target object P, and the distance between the mobile object 10 and the target object P is equal to or shorter than the predetermined distance. Due to this, it is possible to prevent the detection accuracy for the target object P from being lowered at the time of setting the third path R3, and appropriately set the third path R3.

At the step of setting the third path R3, the position of the target object P and the position of the mobile object 10 are caused to be successively detected, and the third path R3 is successively updated. By successively updating the third path R3, an element of feedback control can be introduced, and it is possible to set the third path R3 by which a more appropriate approach to the target object P can be made.

The present control method further includes: a step of setting the fourth path R4 for causing the mobile object 10 to approach the target object P by performing feedback control based on at least one of the relative positions and the relative attitudes of the target object P and the mobile object 10; and a step of switching the third path R3 to the fourth path R4 and causing the mobile object 10 to move along the fourth path R4. According to the present control method, by switching the third path R3 set by optimization calculation to the fourth path R4 of a servo type, the mobile object 10 can come closer to the target object P while making fine adjustments immediately before arriving at the target object P.

The present control method further includes a step of determining to switch the third path R3 to the fourth path R4 in a case in which the mobile object 10 arrives at the switching position A5. The switching position A5 is a position at which the mobile object 10 can be caused to arrive at the target object P while satisfying the condition imposed on the position and the attitude of the mobile object 10 at the time of arriving at the target object P in accordance with the position and the attitude of the target object P, under the restrictions on movement and steering of the mobile object 10. By switching the path to the fourth path R4 under such a condition, the fourth path R4 can be appropriately set.

At the step of setting the fourth path R4, it is determined whether the mobile object 10 can arrive at the target object P without switching between positive and negative of the steering angle of the mobile object 10. In a case in which the mobile object 10 cannot arrive at the target object P, the fourth path R4 is set by performing feedback control based on the relative positions of the target object P and the mobile object 10. In a case in which the mobile object 10 can arrive at the target object P, the fourth path R4 is set by performing feedback control based on the relative attitudes of the target object P and the mobile object 10. By setting the fourth path R4 as described above, it is possible to appropriately match the relative positions and the relative attitudes to each other, and cause the mobile object 10 to arrive at the target object P.

The mobile object 10 according to the present disclosure is configured to automatically move, and includes: the movement control unit 72 that causes the mobile object 10 to move along the first path R1; and the detection control unit 74 that causes the sensor 26 mounted on the mobile object 10 to detect the position and the attitude of the target object P while the mobile object 10 is moving along the first path R1. The movement control unit 72 switches the first path R1 to the second path R2 to the target position A3 at which the predetermined position and attitude with respect to the target object P are achieved, set based on the position and the attitude of the target object P, and causes the mobile object 10 to move along the second path R2. The movement control unit 72 also switches the second path R2 to the third path R3 set by optimization calculation that is executed based on the evaluation function with which the evaluation becomes higher as the deviation between the position of the target object P and the position of the mobile object 10 becomes smaller, and causes the mobile object 10 to move along the third path R3. With the mobile object 10, an appropriate approach to the target object P (target position) can be made.

The computer program according to the present disclosure is configured to cause a computer to perform the control method for the mobile object 10 that automatically moves, and causes the computer to perform: a step of causing the mobile object 10 to move along the first path R1; a step of causing the sensor 26 mounted on the mobile object 10 to detect the position and the attitude of the target object P while the mobile object 10 is moving along the first path R1; a step of setting the second path R2 to the target position A3 at which the predetermined position and attitude with respect to the target object P are achieved based on the position and the attitude of the target object P; a step of switching the first path R1 to the second path R2 to cause the mobile object 10 to move along the second path R2; a step of executing optimization calculation based on the evaluation function with which the evaluation becomes higher as the deviation between the position of the target object P and the position of the mobile object 10 becomes smaller, and setting the third path R3; and a step of switching the second path R2 to the third path R3 to cause the mobile object 10 to move along the third path R3. With this computer program, an appropriate approach to the target object P (target position) can be made.

REFERENCE SIGNS LIST

10 Mobile object
26 Sensor
70 First path information acquisition unit
72 Movement control unit
74 Detection control unit
76 Second path information acquisition unit
78 Third path information acquisition unit
80 Fourth path information acquisition unit
p Target object
r1 First path
r2 Second path
r3 Third path
r4 Fourth path

The invention claimed is:

1. A control method for a mobile object that automatically moves, the control method comprising:
   causing the mobile object to move along a first path;
   causing a sensor mounted on the mobile object to detect a position and an attitude of a target object while the mobile object is moving along the first path;
   setting a second path up to a target position, that is a position where the fork of the mobile object can be inserted into the opening of the target object by straight movement, based on the position and the attitude of the target object;
   switching the first path to the second path to cause the mobile object to move along the second path;
   executing optimization calculation based on an evaluation function with which an evaluation becomes higher as a deviation, indicating the distance between the position of the target object and the position of the mobile object for each read-ahead step at each discrete time after the present time, becomes smaller, to calculate the position and attitude of the mobile object for each of the read-ahead step such that the deviation is minimized, and setting the calculated position and attitude of the mobile object for each of the read-ahead step as a third path; and
   switching the second path to the third path to cause the mobile object to move along the third path.

2. The control method for the mobile object according to claim 1, wherein
   the first path is a route traversing a disposition region in which the target object is disposed, along a second direction intersecting with a first direction at a position closer to the first direction than the disposition region,
   causing the mobile object to move along the first path includes causing the mobile object to move along the first path from a first position on one side with respect to the disposition region in the second direction to a second position on the other side with respect to the disposition region in the second direction, and
   causing the sensor to detect the position and the attitude of the target object includes causing the sensor to detect the position and the attitude of the target object while the mobile object is moving from the first position to the second position.

3. The control method for the mobile object according to claim 2, wherein setting the second path includes setting the second path to include a linear track overlapping a track from the first position to the second position of the first path and a circular arc track connected to the linear track.

4. The control method for the mobile object according to claim 3, wherein setting the second path includes setting the second path to include, as the circular arc track, a first circular arc track running toward an opposite side of the disposition region in the first direction and a second circular arc track connected to the first circular arc track and running toward the disposition region side in the first direction.

5. The control method for the mobile object according to claim 1, further comprising determining whether to switch the second path to the third path based on at least one of detection accuracy for the target object detected by the sensor while the mobile object is moving along the second path, a traveling direction of the mobile object, and a distance between the mobile object and the target object.

6. The control method for the mobile object according to claim 5, wherein determining whether to switch the second path to the third path includes determining to switch the second path to the third path in a case in which reliability of detection accuracy for the target object is equal to or larger than a predetermined value, the mobile object is traveling in a direction coming closer to the target object, and the distance between the mobile object and the target object is equal to or shorter than a predetermined distance.

7. The control method for the mobile object according to claim 1, wherein setting the third path includes causing the position of the target object and the position of the mobile object to be successively detected to successively update the third path.

8. The control method for the mobile object according to claim 1, further comprising:
   setting a fourth path for causing the mobile object to approach the target object by performing feedback control based on at least one of relative positions and relative attitudes of the target object and the mobile object; and
   switching the third path to the fourth path to cause the mobile object to move along the fourth path.

9. The control method for the mobile object according to claim 8, further comprising:

determining to switch the third path to the fourth path in a case in which the mobile object arrives at a switching position, wherein the switching position is a position at which the mobile object is able to be caused to arrive at the target object while satisfying a condition imposed on the position and the attitude of the mobile object at the time of arriving at the target object in accordance with the position and the attitude of the target object, under restrictions on movement and steering of the mobile object.

10. The control method for the mobile object according to claim 8, wherein setting the fourth path includes determining whether the mobile object is able to arrive at the target object without switching between positive and negative of a steering angle of the mobile object, setting the fourth path by performing feedback control based on the relative positions of the target object and the mobile object in a case in which the mobile object is unable to arrive at the target object, and setting the fourth path by performing feedback control based on the relative attitudes of the target object and the mobile object in a case in which the mobile object is able to arrive at the target object.

11. A mobile object that automatically moves, the mobile object comprising:

a moving mechanism;

a sensor;

a movement control unit configured to cause the mobile object to move along a first path by controlling the moving mechanism; and a detection control unit configured to cause a-sensor mounted on the mobile object to detect a position and an attitude of a target object while the mobile object is moving along the first path, wherein the movement control unit switches the first path to a second path up to a target position, that is a position where the fork of the mobile object can be inserted into the opening of the target object by straight movement, set based on the position and the attitude of the target object, and causes the mobile object to move along the second path, and switches the second path to a third path set by optimization calculation that is executed based on an evaluation function with which an evaluation becomes higher as a deviation, indicating the distance between the position of the target object and the position of the mobile object for each read-ahead step at each discrete time after the present time, becomes smaller, to calculate the position and attitude of the mobile object for each of the read-ahead step such that the deviation is minimized, and setting the calculated position and attitude of the mobile object for each of the read-ahead step as the third path and causes the mobile object to move along the third path by controlling the moving mechanism.

12. A non-transitory computer-readable storage medium storing a program for causing a computer to perform a control method for a mobile object that automatically moves, the program comprising:

causing the mobile object to move along a first path;

causing a sensor mounted on the mobile object to detect a position and an attitude of a target object while the mobile object is moving along the first path;

setting a second path up to a target position, that is a position where the fork of the mobile object can be inserted into the opening of the target object by straight movement, based on the position and the attitude of the target object;

switching the first path to the second path to cause the mobile object to move along the second path;

executing optimization calculation based on an evaluation function with which an evaluation becomes higher as a deviation, indicating the distance between the position of the target object and the position of the mobile object for each read-ahead step at each discrete time after the present time, becomes smaller, to calculate the position and attitude of the mobile object for each of the read-ahead step such that the deviation is minimized, and setting the calculated position and attitude of the mobile object for each of the read-ahead step asset a third path; and switching the second path to the third path to cause the mobile object to move along the third path.

\* \* \* \* \*